United States Patent
Patterson et al.

(10) Patent No.: US 10,152,293 B2
(45) Date of Patent: *Dec. 11, 2018

(54) DISPLAY PANEL ATTACHMENT MECHANISM

(71) Applicant: Barco, Inc., Duluth, GA (US)

(72) Inventors: Marcus Robert Patterson, Glenfield (NZ); Grant Arthur John Elliott, Tai Po (HK)

(73) Assignee: Barco, Inc., Duluth, GA (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/678,042

(22) Filed: Aug. 15, 2017

(65) Prior Publication Data

US 2018/0024802 A1   Jan. 25, 2018

Related U.S. Application Data

(63) Continuation of application No. 15/340,870, filed on Nov. 1, 2016, now Pat. No. 9,733,885, which is a continuation of application No. 14/798,404, filed on Jul. 13, 2015, now Pat. No. 9,483,227, which is a continuation of application No. 13/942,373, filed on Jul. 15, 2013, now Pat. No. 9,080,912, which is a continuation of application No. 13/494,858, filed on Jun. 12, 2012, now Pat. No. 8,485,689, which is a continuation of application No. 12/484,205, filed on Jun. 13, 2009, now Pat. No. 8,197,088.

(Continued)

(51) Int. Cl.
*F21V 21/14* (2006.01)
*G06F 3/14* (2006.01)
*G09F 9/302* (2006.01)
*G01J 3/28* (2006.01)
*F21V 21/088* (2006.01)
*G06F 1/00* (2006.01)
*G09F 9/33* (2006.01)
*F21S 2/00* (2016.01)
*G06F 3/01* (2006.01)
*G06F 3/03* (2006.01)

(52) U.S. Cl.
CPC .......... *G06F 3/1446* (2013.01); *F21S 2/005* (2013.01); *F21V 21/088* (2013.01); *G01J 3/28* (2013.01); *G06F 1/00* (2013.01); *G06F 3/017* (2013.01); *G06F 3/0304* (2013.01); *G09F 9/3026* (2013.01); *G09F 9/33* (2013.01); *H05K 999/99* (2013.01); *Y10T 29/49826* (2015.01)

(58) Field of Classification Search
CPC ...... G09F 15/0068; G09F 9/33; G09F 9/3026; G06F 3/1446; F21V 21/14
See application file for complete search history.

(56) References Cited

U.S. PATENT DOCUMENTS

| | | | |
|---|---|---|---|
| 6,065,854 A | 5/2000 | West et al. | |
| 8,197,088 B2 * | 6/2012 | Patterson | G06F 3/1446 |
| | | | 362/249.02 |

(Continued)

*Primary Examiner* — Anabel Ton
(74) *Attorney, Agent, or Firm* — Aka Chan LLP

(57) ABSTRACT

A light-emitting display system has interlocking tiles. In an implementation, each tile has a portion of a clamp that joins with another portion of the clamp on another tile. A tile is removed from the display by unlocking the clamp portions. The tile is removed without affecting the position of the other tiles in the display.

20 Claims, 17 Drawing Sheets

Related U.S. Application Data

(60) Provisional application No. 61/061,338, filed on Jun. 13, 2008, provisional application No. 61/061,347, filed on Jun. 13, 2008, provisional application No. 61/061,353, filed on Jun. 13, 2008, provisional application No. 61/061,358, filed on Jun. 13, 2008, provisional application No. 61/061,365, filed on Jun. 13, 2008, provisional application No. 61/061,369, filed on Jun. 13, 2008.

(56) References Cited

U.S. PATENT DOCUMENTS

| | | |
|---|---|---|
| 8,485,689 B2 | 7/2013 | Patterson et al. |
| 9,080,912 B2 | 7/2015 | Patterson et al. |
| 9,483,227 B2 | 11/2016 | Patterson et al. |
| 2009/0034241 A1 | 2/2009 | Coushaine et al. |
| 2009/0096804 A1 | 4/2009 | Gerets et al. |
| 2009/0310065 A1 | 12/2009 | Dunn |
| 2009/0310337 A1 | 12/2009 | Patterson et al. |
| 2009/0311065 A1 | 12/2009 | Gaudette |

* cited by examiner

DISPLAY PANEL ATTACHMENT MECHANISM

CROSS-REFERENCE TO RELATED APPLICATIONS

This patent application is a continuation of U.S. patent application Ser. No. 15/340,870, filed Nov. 1, 2016, issued as U.S. Pat. No. 9,733,885 on Aug. 15, 2017, which is a continuation of U.S. patent application Ser. No. 14/798,404, filed Jul. 13, 2015, issued as U.S. Pat. No. 9,483,227 on Nov. 1, 2016, which is a continuation of U.S. patent application Ser. No. 13/942,373, filed Jul. 15, 2015, issued as U.S. Pat. No. 9,080,912 on Jul. 14, 2015, which is a continuation of U.S. patent application Ser. No. 13/494,858, filed Jun. 12, 2012, issued as U.S. Pat. No. 8,485,689 on Jul. 16, 2013, which is a continuation of U.S. patent application Ser. No. 12/484,205, filed Jun. 13, 2009, issued as U.S. Pat. No. 8,197,088 on Jun. 12, 2012, which claims the benefit of U.S. patent application Ser. Nos. 61/061,338; 61/061,347; 61/061,353; 61/061,358; 61/061,365; and 61/061,369, all filed Jun. 13, 2008. These applications are incorporated by reference along with all other references cited in this application.

BACKGROUND OF THE INVENTION

This disclosure generally relates to display units and particularly to a display unit comprising groups of light-emitting elements mounted to a support structure such that the display may be easily and safely installed and reconfigured while retaining both strength and positional accuracy. The invention discloses improvements in the structure and manufacture of such systems.

Display units for entertainment, architectural, and advertising purposes have commonly been constructed of numbers of light-emitting elements such as LEDs or incandescent lamps mounted onto flat tiles. The light-emitting elements can be selectively turned on and off to create patterns, graphics, and video displays for both informational and aesthetic purposes. These displays may be constructed as tiles or large panels which are assembled in position for a specific entertainment show or event or as an architectural or advertising display.

When such a display is used for an event or theatrical production, it is desirable that the display be easily removable, for example in between scenes of a play or theatrical event, as the needs of the production dictate. Some systems use a tile based structure where a tile, typically around 61 centimeters×61 centimeters (i.e., 2 feet×2 feet), can be lifted by hand and positioned. Accurate positioning of the tiles may be a time consuming and complex process involving skilled personnel.

Displays of these types may be constructed at different resolutions where the spacing between the light-emitting elements can be varied. It may also be a requirement to change this spacing at different points on the display. It would be advantageous to have a support and installation structure for such a display that was simple to install and that facilitated use in differing resolutions and on different planes through a single easily adjustable structure.

Small errors in the positioning of the pixels within tiles and tiles within a display can be cumulative and may lead to large errors in overall pixel alignment accuracy. At the same time the display support system must be strong enough to support a large area of display tiles and to withstand side loads from wind and weather if used outside. The goal of simultaneous strength, rigidity and accuracy is one that is not achieved in prior art systems and the user typically has to accept a reduced accuracy in order to achieve the required strength.

The disclosed invention solves these problems and discloses improvements in the structure and manufacture of such display units so as to provide a single comprehensive display system and support structure capable of providing both strength and rigidity in both planar and nonplanar arrangements while also presenting a high level of accuracy for tile and pixel placement. Additionally the disclosed invention provides improved means for removing and replacing a tile in a display.

BRIEF SUMMARY OF THE INVENTION

A light-emitting display system has interlocking tiles. In an implementation, each tile has a portion of a clamp that joins with another portion of the clamp on another tile. A tile is removed from the display by unlocking the clamp portions. The tile is removed without affecting the position of the other tiles in the display.

In a specific implementation, a light-emitting display system includes a first light-emitting tile having multiple light-emitting elements and a first connecting member attached adjacent to an edge of the first tile. There is a second light-emitting tile having multiple light-emitting elements and a second connecting member attached adjacent to an edge of the second tile. The first connecting member is configured to connect with the second connecting member such that a side of the first light-emitting tile abuts a side of the second light-emitting tile.

The first connecting member may be configured to removably connect with the second connecting member. The first connecting member may include a clip and the second connecting member may include a receptacle. In an implementation, the clip includes a hook and a lever. The receptacle includes a dowel. The lever is configured to engage the hook and the hook is configured to engage the dowel.

The hook, the lever, and the dowel may each be configured to be movable between an engaged position and a nonengaged position. In an implementation, in the engaged position, the lever engages the hook such that the hook applies a force to the dowel, and the dowel then engages an alignment hole formed within the clip.

There may be a biasing mechanism disposed adjacent to the dowel which biases the dowel towards the nonengaged position. An adjustment plate may be placed adjacent to one of the clip and the receptacle.

In a specific implementation, a light-emitting display system includes a first light-emitting tile with multiple light-emitting elements. A clip is attached adjacent to an edge of the first tile. There is a second light-emitting tile with multiple light-emitting elements. A receptacle is attached adjacent to an edge of the second tile. The clip is configured to engage the receptacle such that a side of the first light-emitting tile abuts a side of the second light-emitting tile.

The clip may include a lever and a hook. The receptacle may include a dowel, where the hook of the clip is configured to engage the dowel of the receptacle. In an implementation, the lever, the hook, and the dowel are movable between an engaged position and a nonengaged position. In the engaged position, the lever may engage the hook, the hook may engage the dowel, and the dowel may engage an alignment hole formed within the clip.

In an implementation, when the lever engages the hook, the lever translates a force to the hook and the hook translates a force to the dowel. The receptacle may further include a biasing mechanism, where the biasing mechanism biases the dowel towards the nonengaged position (or unengaged or disengaged position).

The force of the hook may oppose the biasing force of the biasing mechanism. There may be a safety latch. In an implementation, the safety latch is adjacent the receptacle and is configured to engage a receptor at an end of the lever. In an implementation, the safety latch is adjacent the clip. A detent formed within the safety latch is configured to engage a tab at a base of the lever.

In a specific implementation, a method of manufacturing a display tile includes providing the display tile having a viewing surface and a back surface. Disposing multiple light-emitting elements on the viewing surface of the display tile, and attaching one of a clip and a receptacle to an edge of the back surface. The one of the clip and the receptacle is configured to connect with the other of the clip and the receptacle.

The clip may include a lever and a hook. The receptacle may include a dowel, where the hook of the clip is configured to engage the dowel of the receptacle. The method may further include disposing a safety latch adjacent to the one of the clip and the receptacle. The method may further include attaching an adjustment plate adjacent to the one of the clip and the receptacle.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
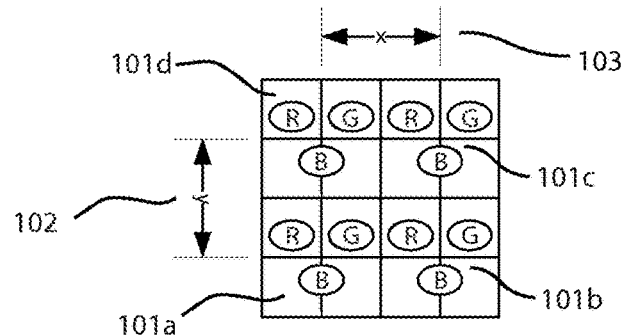
FIG. 1 shows four pixels in a video display.

FIG. 1 shows four pixels in a video display. Each pixel 101*a*, 101*b*, 101*c*, and 101*d* may be constructed from 3 LEDs: red (R), green (G), and blue (B). The distance 103 and 102 between the center of a pixel 101 and its adjacent pixels is referred to as the pixel pitch. The x-axis pixel pitch 103 may be the same as the y-axis pixel pitch 102.

In a large display with a large number of pixels it is desirable that the pixel pitch is controlled within tight tolerances. Errors in the pixel pitch across the display may be apparent to the viewer and adversely affect the image quality.

Some more details on video display products can be found in U.S. patent application Ser. No. 12/415,627, filed Mar. 31, 2009; U.S. patent application Ser. Nos. 12/484,200, 12/484,201, 12/484,202, and 12/484,203, filed Jun. 13, 2009; and U.S. provisional patent applications 61/072,597, filed Mar. 31, 2008, and 61/170,887, filed Apr. 20, 2009, which are incorporated by reference.

Figure 2:
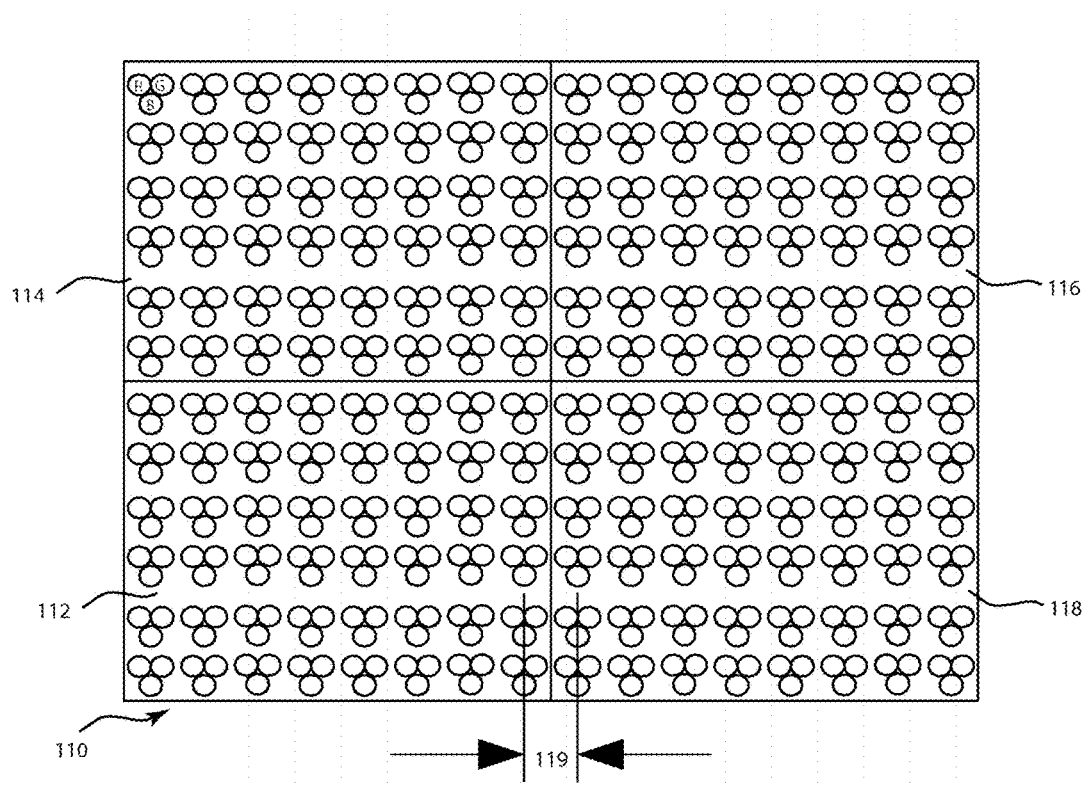
FIG. 2 shows a portion of a modular video display.

FIG. 2 illustrates a portion of a modular video display 110 where display modules 112, 114, 116, and 118 are mounted adjacent to each other to form a single display. Controlling pixel alignment and pitch within a single module may be accomplished through such means as accurate component placement on a printed circuit board within the module housing. The modules may be constructed from plastic, and be sufficiently small that the tolerances within the modules can be tightly controlled.

However the pitch 119 between the pixels on adjacent modules is controlled by the accurate mechanical alignment and spacing of the individual modules. If this alignment and spacing is not accurately maintained, gaps may appear in the display which appear darker when the screen is set to black. Additionally, banding can appear due to perceived luminance errors. For example, if the pixel pitch between modules is greater than the pixel pitch within the module, then the effective area subtended to the viewer by the pixels at the boundary is larger than those within the module. This increased effective area causes the perceived luminance of the pixels at the boundaries of the modules to be lower than the pixels within the module, thereby causing an apparent band or stripe in the image.

In a typical prior art modular display screen, a number of display modules are mounted onto a larger tile and these tiles are connected together to form the entire screen. The tiles are typically constructed from folded sheet metal, and are large compared to the modules. These tiles and their interconnection provide both the alignment of the display modules and the structural support and strength to form the mechanical infrastructure of the screen. If a screen is intended for an outdoor application then it must further be able to withstand wind loadings producing significant sideways forces.

Figure 3:
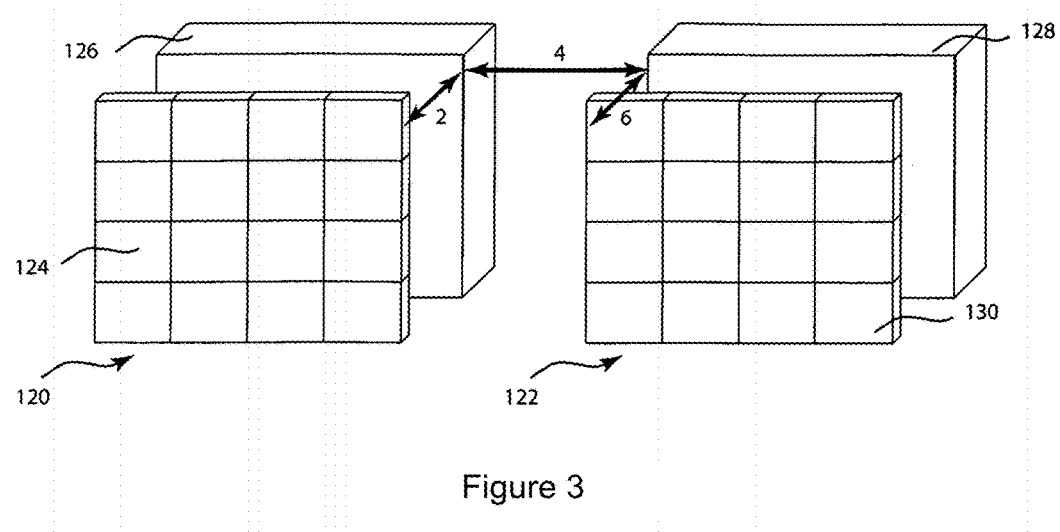
FIG. 3 shows the tolerance and alignment variables in a modular video display.

FIG. 3 shows the tolerance and alignment variables in a modular video display. A plurality of display modules 124 are assembled onto a support structure 126 to form tile 120 and a second plurality of display modules 122 are assembled onto support structure 128 to form a second tile 122. Support structures 126 and 128 are interconnected to support and align the two tiles. The alignment of the display modules 124 on tile 120 with display modules 122 on tile 122 are affected by multiple and cumulative tolerances; tolerance 2 between tile 120 and support structure 126, tolerance 4 between support structure 126 and support structure 128 and tolerance 6 between support structure 128 and tile 122.

In a prior art system such tolerances may accumulate and produce a total pixel positional error as high as ±8.25 percent (total 16.5 percent) resulting in visible and objectionable luminance difference between the pixels at the tile boundaries and the pixels within the tile. Such a gap between tiles will be noticeable and detract from a cohesive look.

Although here we are referring to tolerances in a single axis, it is also important to note that these tolerances are present and important in all 3 axes.

The prior art uses the support structure 126, 128 to provide both:

1. Alignment—ensuring that the tiles align to form a cohesive display; and
2. Structural Strength or Support—ensuring that the screen can support itself safely as well as endure additional forces from wind loading in outdoor situations.

Alignment accuracy is desirable for display quality but the large structural parts needed to simultaneously achieve the strength goals may hinder that accuracy. Achieving the tight tolerances needed with large structural components can be difficult and expensive, and the machining of large parts is very expensive and increases complexity.

This invention improves on the prior art and discloses means for assembling a modular display which provides enhanced alignment accuracy while allowing individual tiles to be easily and safely replaced.

Figure 4:
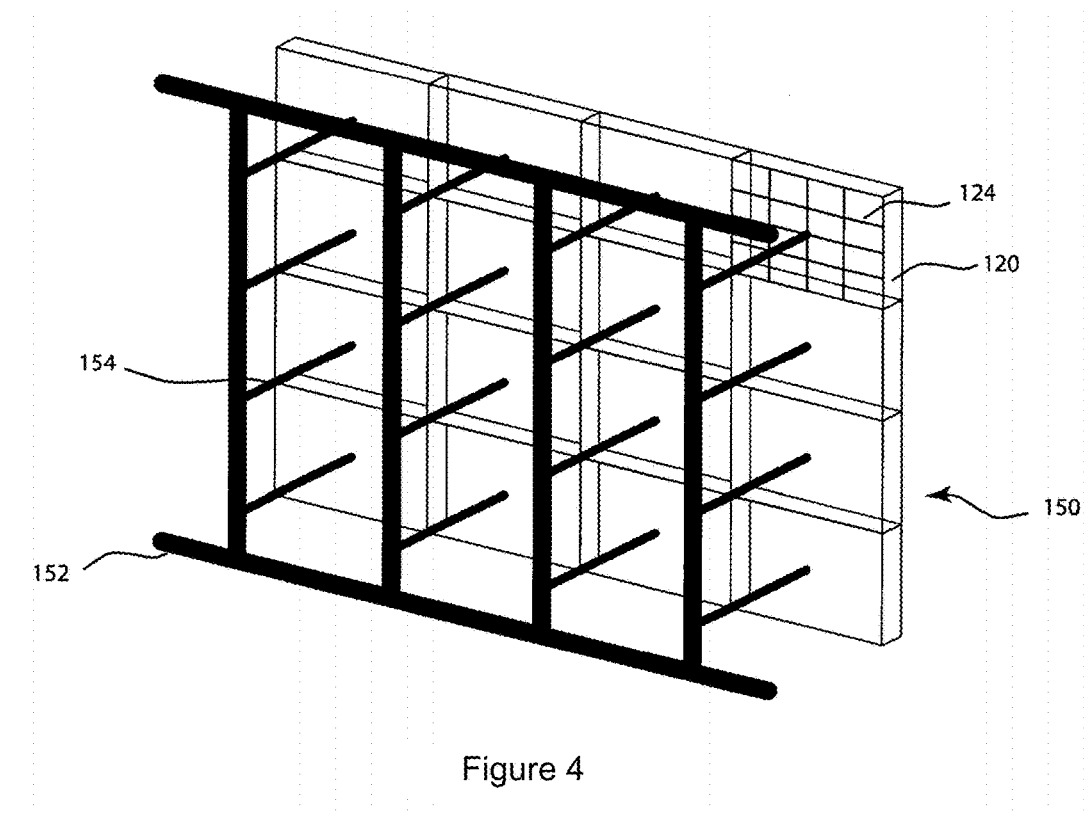
FIG. 4 shows an embodiment of the present disclosure showing the separate structural and alignment members of a video display.

FIG. 4 shows an embodiment of the present disclosure showing the separate structural and alignment members (i.e., alignment mechanism) of a video display 150. Multiple display modules 124 are assembled into a plurality of tiles 120. In a specific implementation, tiles 120 connect to or interlock with adjacent tiles through attachment mechanisms such as latches, clips, clamps, mounts, rotary-lock mounts (e.g., NCC rotary-lock mount), or any other types of fastener which provide accurate and improved alignment. Some specific examples of latches include spring latches, slam latches, cam locks, Norfolk latches, Suffolk latches, cross bars, cabin hooks, bolt lock latches, compression latches, draw latches, over center draw latches, pull draw latches, rotary action latches, concealed draw latches, fixed grip cam latches, adjustable grip cam latches, vise action compression latches, lift and turn compression latches, lever latches, and self-adjusting latches.

The tiles may be manufactured using injection molding or other any other techniques which have inherently high levels of accuracy compared to the sheet metal and machining techniques used in the prior art. Thus the video display will be accurately aligned and cohesive in its appearance.

Although such a structure may have sufficient inherent strength for many applications there are circumstances, such as outdoor use, where the display has to withstand substantial forces from wind loading. In these circumstances, additional structural support and strength may be provided though a secondary structural support 152. The secondary structural support is connected to the display tiles through attachment mechanisms 154 such that the alignment of the display tiles remains uncompromised. The secondary structural support may provide the extra strength required to resist other applied forces such as wind loading.

To ensure that any inaccurate alignment of structural support 152 does not compromise or affect the alignment of the display tiles 120, the interconnecting members 154 are constructed so as to take up or nullify any tolerance difference between the accurately aligned display tiles 120 and the structural support 152. Alignment accuracies up to an order (or orders) of magnitude better than the prior art system can be provided by the separation of the functions of alignment and support.

Figure 5:
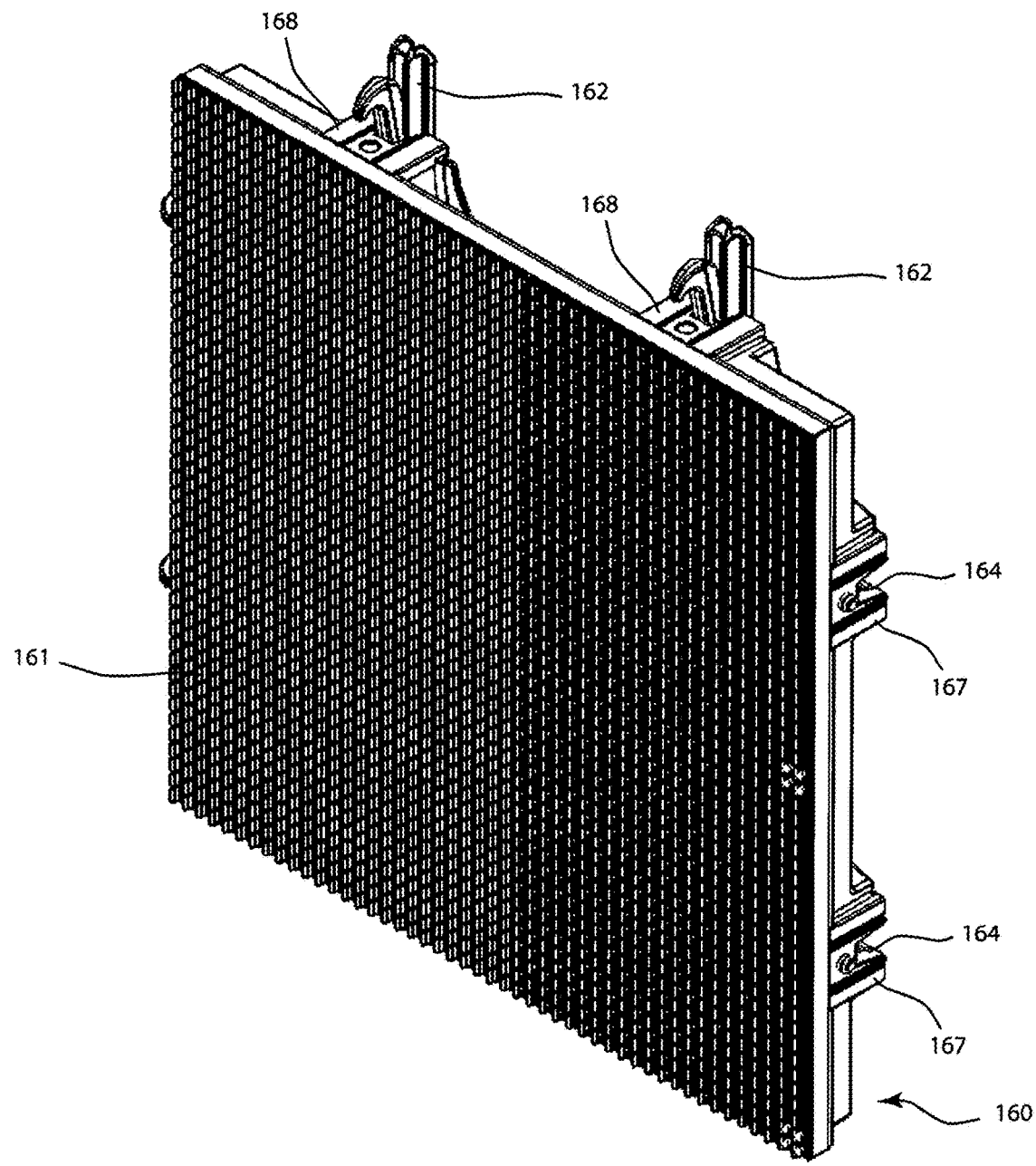
FIG. 5 shows an embodiment of the present disclosure showing an isometric view of a single tile of a video display.

FIG. 5 shows an embodiment of the present disclosure showing an isometric view of a single tile 160 of a video display. A plurality of pixels 161 are mounted to a display tile 160. Display tile 160 is accurately constructed to very tight tolerances and may use injection molding or other inherently accurate manufacturing technique. The strength requirement for tile 160 is significantly reduced because in a specific implementation it supports itself and adjacent tiles without having to provide the additional and significantly greater strength needed to endure the stresses put on the system by wind loading when used outdoors.

Alignment between adjacent tiles 160 is provided through male connecting members, such as clips 162, and female connecting members, such as receptacles 164. In this specific implementation, the connecting members are located on a back side of the tile, but may instead or additionally be located on a front side of the tile. Clips 162 and receptacles 164 provide highly accurate alignment of adjacent tiles with a lessened requirement to transmit support or strength between those tiles. This allows the use of accurate construction to very tight tolerances which may use injection molding or other inherently accurate manufacturing technique.

Removing the strength requirement from these connecting members or attachment mechanisms allows cheaper (i.e., less costly), smaller, more accurately manufactured parts to be used and ensures highly accurate alignment. For example, less material (e.g., plastic and metal), less expensive materials, or both may be used in making the attachment mechanisms because the attachment mechanisms do not have to provide structural support. In other words, in a specific implementation, the attachment mechanisms are not load-bearing or do not require design computations for bearing specific loads such as wind loads, the dead load (e.g., weight) of the tile or adjacent tiles, seismic loads, live loads, and so forth. In this specific implementation, the attachment mechanisms do not carry the weight of the tile and do not resist or transfer significant forces. In another implementation, the attachment mechanisms are designed to support the weight of the tile, but do not need to support other forces (e.g., wind).

In these specific implementations, less material needs to be used and a lighter-weighing tile can be produced as compared to tiles with attachment mechanisms that are designed to bear significant structural loads. A lighter-weighing tile offers several benefits. For example, the tile is easier to transport, assemble, disassemble, configure, reconfigure, and replace.

In other implementations, the attachment mechanisms provide at least some structural support. For example, the attachment mechanisms may provide at least some support for bearing wind loads, the dead load of the tile, or both wind loads and dead loads. In this specific implementation, the attachment mechanisms carry a portion of the load (e.g., wind load, dead load, or both). The remaining portion of the load may be carried by secondary structural support 152. Typically, the portion of the load carried by the attachment mechanisms will be less than the portion of the load carried by the secondary structural support. For example, the attachment mechanisms may carry about 1, 2, 3, 4, 5, 10, 15, 20, 25, 30, 35, 40, or 45 percent of the total load. In various other implementations, the portion of the load carried by the attachment mechanisms is the same as the load carried by the secondary structural support. The portion of the load carried by the attachment mechanisms is greater than the load carried by the secondary structural support.

A single attachment mechanism for a tile may be able to support at least the weight of the tile divided by the number of attachment mechanisms attached to the tile. In a specific implementation, a tile has two attachment mechanisms per side for a total of eight attachment mechanisms and weighs about 5 kilograms. In this specific implementation, a single attachment mechanism can support at least 0.62 kilograms (e.g., 5 kilograms/8 attachment mechanisms=0.62 kilograms).

In this specific implementation, tile 160 has two connecting members on each of its four sides. A side has connecting members of a first type (e.g., male connecting members) and an opposite side has connecting members of a second type (e.g., female connecting members), different from the first type. A side has connecting members of a first type and an adjacent side has connectors of a first type or connectors of a second type. For example, a top side includes a first set of two male connecting members. A bottom side includes a second set of two female connecting members. A right-hand side includes a third set of two female connecting members. A left-hand side includes a fourth set of two male connecting members.

In another implementation, a side has connecting members of a first type and an opposite side has connecting members of the first type. It should also be appreciated that a side can have any number of connectors including no connectors, 1, 3, 4, 5, 6, 7 connectors, or more than 7 connectors. A number of connectors on one side may be equal to or different from a number of connectors on another side (e.g., opposite side or adjacent side).

Furthermore, the connectors on a side may or may not be equally spaced. The connectors may be equally distributed along a length of the side. The connectors may be equally spaced from a midpoint of the side.

In this specific implementation, the tile has four sides and has the shape of a square. In this specific implementation, a length of a side of the square is about 400 millimeters. However, the length can range from about 50 millimeters to about 5000 millimeters including, for example, 100, 200, 300, 500, 600, 700, 800, 900, 1000, 2000, 4000, or more than 5000 millimeters. In some implementations, the length is less than 50 millimeters.

It should also be appreciated that the tile can have any number of sides and can be in any shape. Some examples of other shapes include rectangles, triangles, circles, and ovals.

Figure 6:
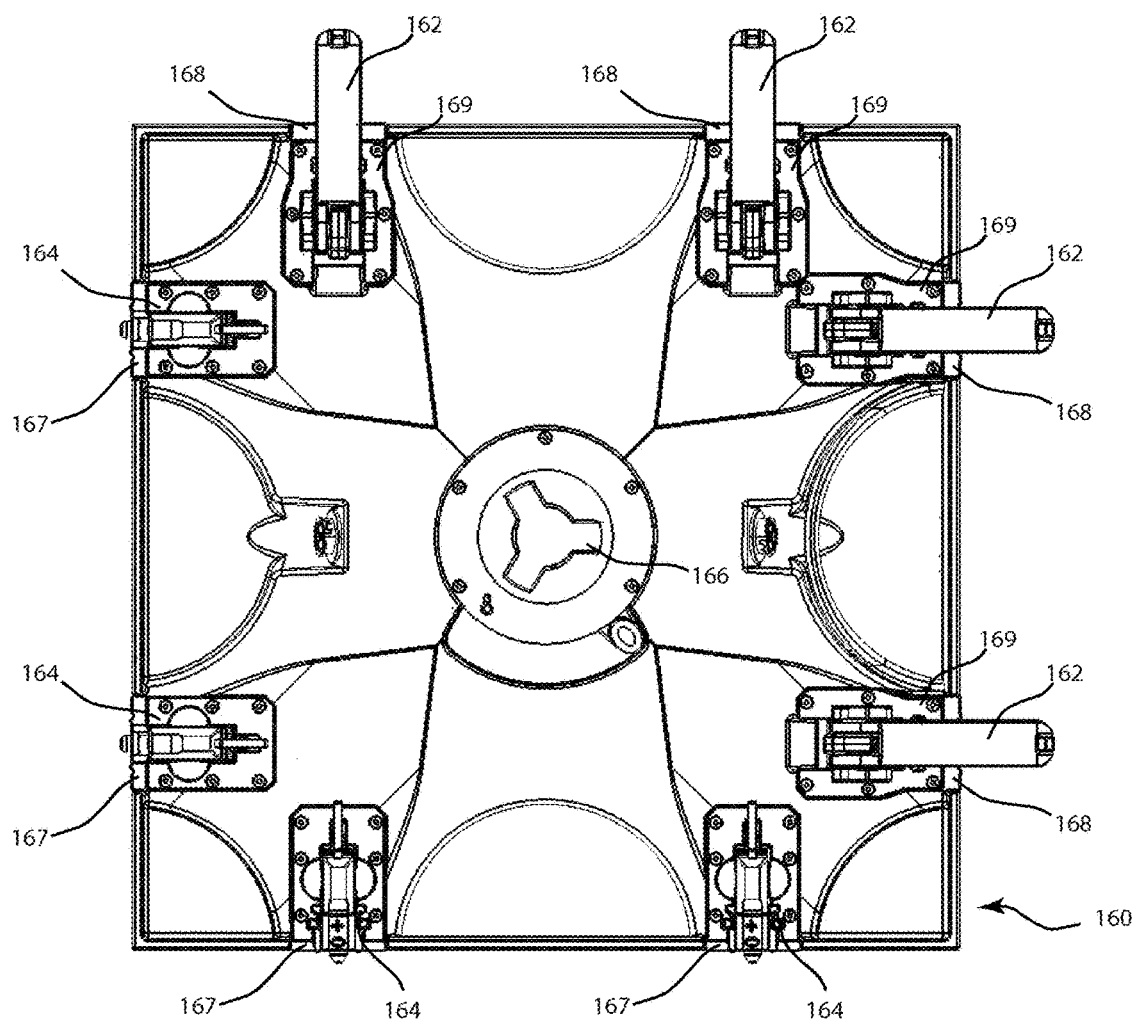
FIG. 6 shows an embodiment of the present disclosure showing the rear view of a single tile of a video display.

FIG. 6 is a further illustration of an embodiment of the present disclosure showing the rear view of a single tile of a video display. Clips 162 on the edge of a tile may connect to receptacles 164 on the adjacent tile. When clip 162 is closed angle adjustment plate 167 will be pulled into contact with clamp plate 168 on the adjacent tile. Clip 162 is designed such that it can accommodate a wide range of angles in angle adjustment plate 167 and still maintain accurate and secure connection between the tiles. Similarly clips 162 on a further edge of a tile may connect to receptacles 164 on the adjacent tile and angle adjustment plates 167 will be pulled into contact with clamp plate 168. Strength and support for tile 160 is provided through center attachment point 166 which connects to the interconnecting member back to the structural support. Through such means a modular display of any size and shape may be quickly and accurately constructed.

FIGS. 7 and 8A-C show an embodiment of the present disclosure showing the rear view of a tile and the clamping assembly which ensures accurate alignment between adjacent tiles. Each clamp assembly includes a clip 162 and a receptacle 164. Each tile may have two sides with clips and two sides with receptacles. The clips 162 further include a hook 201 and an operating lever 163 connected to the body of the clip 205. The body of the clip 205 may be securely attached to a tile 160. The receptacles include a retractable dowel 202 and a spring 203 (i.e., a biasing mechanism). Spring 203 may connect the retractable dowel 202 to the body of the receptacle 204. The body of the receptacle 204 may be securely attached to a tile 160. Although the use of two clips on two sides of the tile is illustrated here the disclosure is not so limited and tiles may be constructed with any number of clips on any number of sides without departing from the spirit of the disclosure. In particular a small tile may use only one clip on a side of the tile while larger tiles may include three or more clips.

Figure 8C:
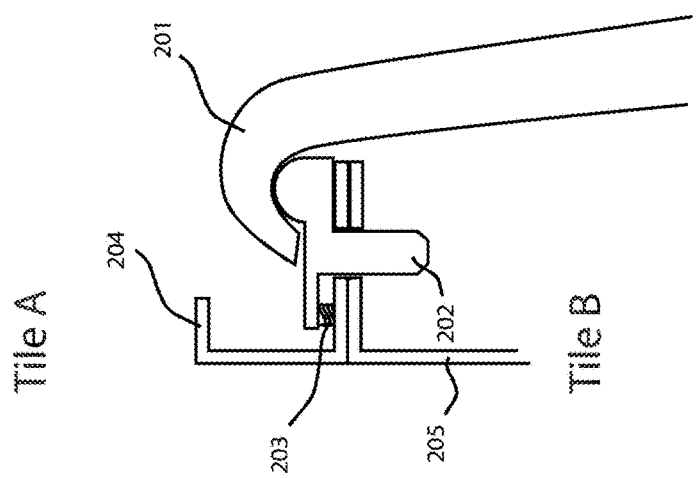
FIGS. 8A-8C show an embodiment of the present disclosure showing a section through the connection system between two tiles.
Figure 8B:
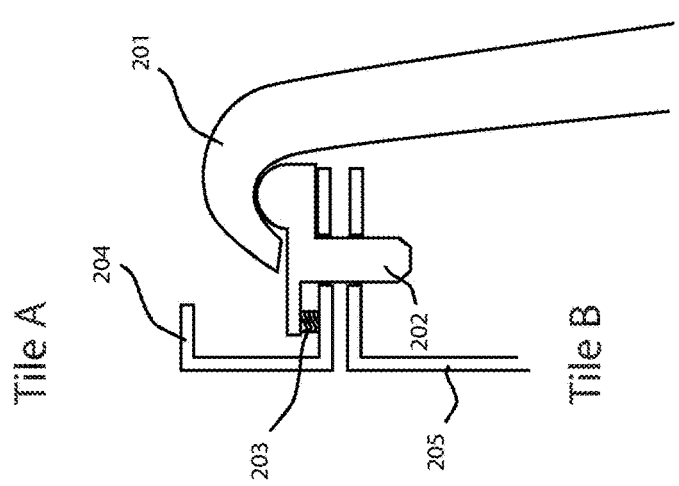
Figure 8A:
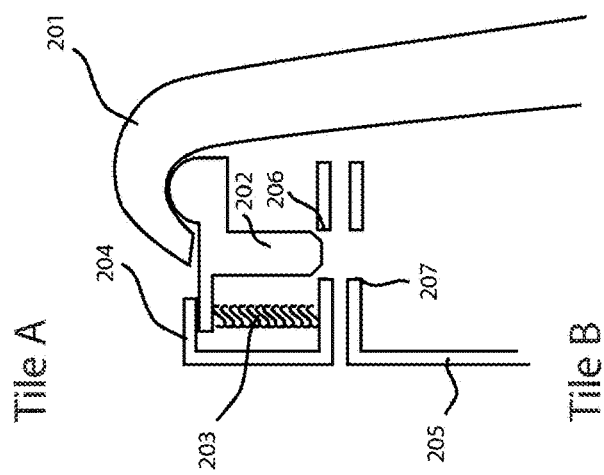

FIG. 8A shows the first stage in the joining and alignment of two adjacent tiles A and B. Receptacle 204 in tile A is separated from and misaligned with clip 205 in the adjacent tile B. Retractable dowel 202 is pushed back by spring 203 into its resting position clear of the alignment hole 206 in receptacle 204. In this specific implementation, the spring is a compression spring which pushes or urges the retractable dowel away from alignment hole 206. Hook 201 from tile B is placed over the retractable dowel 202 in tile A.

As pressure is applied to hook 201 by either or both of the weight of the tile and operating lever 163 pressure is applied from hook 201 to retractable dowel 202 opposing the force provided by spring 203 and tending to compress spring 203. Retractable dowel 202 is free to slide within receptacle 204 and, as spring 203 compresses, passes through alignment hole 206 in receptacle 204 and alignment hole 207 in clip 205 as shown in FIG. 8B.

FIG. 8B shows receptacle 204 and clip 205 aligned but still separated. Retractable dowel 202 is a precise tolerance fit into the two alignment holes 206 and 207, thus receptacle 204 and clip 205 are brought into accurate alignment in two planes defined by the retractable dowel 202 and alignment holes 206 and 207. To allow easy assembly and swinging the hook into and out of position with misaligned tiles hook 201 is free to move in at least two planes—both parallel and perpendicular to the axis of the retractable dowel and alignment holes. However retractable dowel 202 may be constrained to move only in a single plane along its axis and thus can be a very high tolerance fit within alignment holes 206 and 207.

This separation of the retractable dowel 202 from the pressure applying hook 201 further separates the high positional accuracy alignment components 202, 206, and 207 from the lower positional accuracy strength providing component 201. This ensures easy and simple assembly of the joint while still ensuring a high degree of accuracy of alignment as the hook 201 is unconstrained in its movement and may be brought into approximate position easily thus removing any necessity for retractable dowel 202 to have any freedom of movement off its main axis.

FIG. 8C shows the final locked and clamped position where hook 201 has fully engaged retractable dowel 202 and receptacle 204 and clip 205, and thus tiles A and B, aligned and abutting. Releasing the clamp follows the reverse process, as pressure on hook 201 is removed spring 203 will push retractable dowel 202 back out of alignment holes 206 and 207 thus disconnecting receptacle 204 from clip 205.

The retractable dowel 202 may further facilitate safely and simply removing or changing a tile in a display either during initial construction or when replacing a tile for maintenance. The procedure to install a tile may be as follows; firstly two adjacent tiles, A and B are roughly positioned with hooks 201 from Tile B positioned over retractable dowels 202 from Tile A. At this point tile B's weight is safely supported by hooks 201 with pressure being applied to the retractable dowels 202. The operator may now safely release the weight of the tile and is free to adjust its position such that apertures 206 and 207 are brought into alignment. As apertures 206 and 207 are aligned the retractable dowel 202 will be pushed through both apertures by the weight of the tile and will thus be in the correct position such that clamps may be closed securing the hook 201 and dowels 202.

Removal is the reverse process, where the operating levers 163 are unlocked and released so that the spring 203 will push retractable dowels 202 out of the alignment holes 206 and 207. The full retraction of the dowels under spring pressure allows the tile to be removed from the display even if it is a central tile in situ with tiles surrounding it on all four sides. Thus any tile can be removed and replaced in a fully constructed display with no need to dismantle the display.

Figure 7:
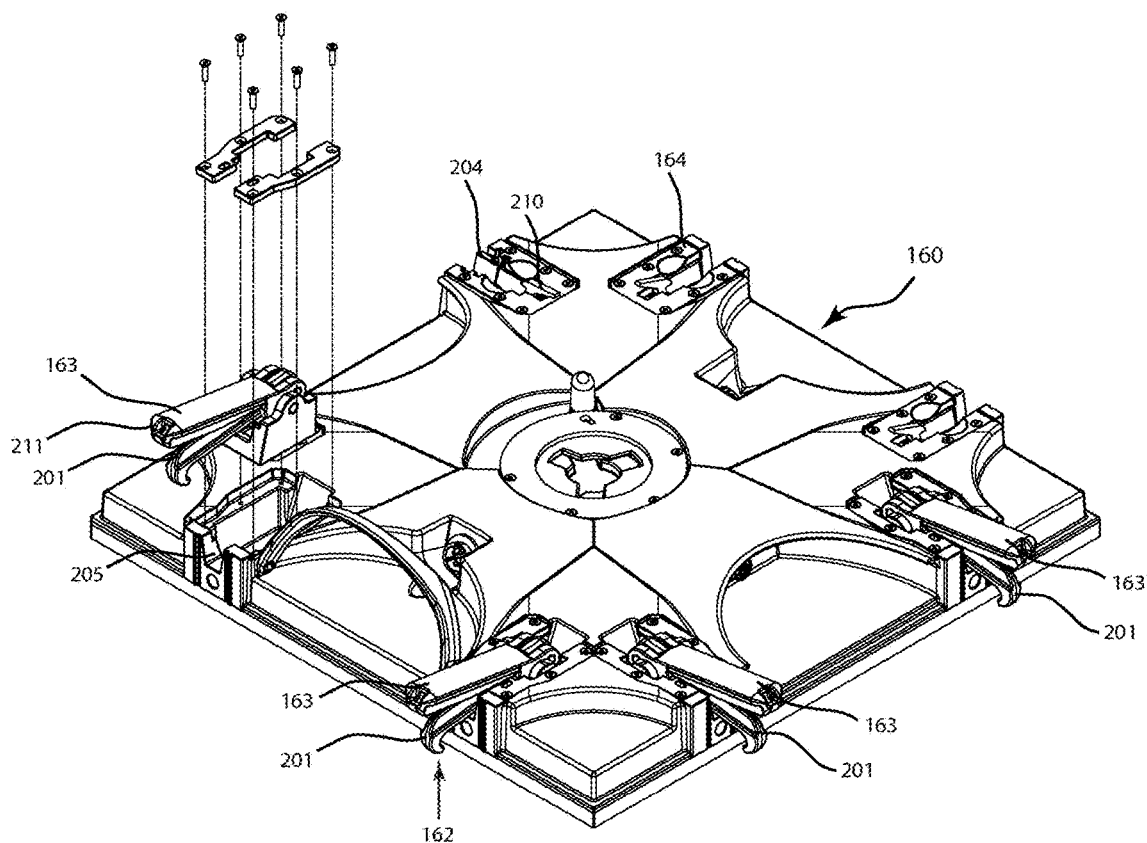
FIG. 7 shows an embodiment of the present disclosure showing the rear view of a single tile of a video display.

FIG. 7 also illustrates one embodiment of safety latches that ensure that operating lever 163 remains latched after assembly. When operating lever 163 is fully closed and two tiles are clamped together safety latch 210 on receptacle 204 engages with a receptor 211 at the end of the operating lever 163. The engagement of the safety latch 210 is automatic as the operating lever is closed and prevents the accidental opening of the operating lever. When an operator wishes to release the operating lever to separate the clamp he must first depress the safety latch 210 before lifting the operating lever 163.

Figure 9:
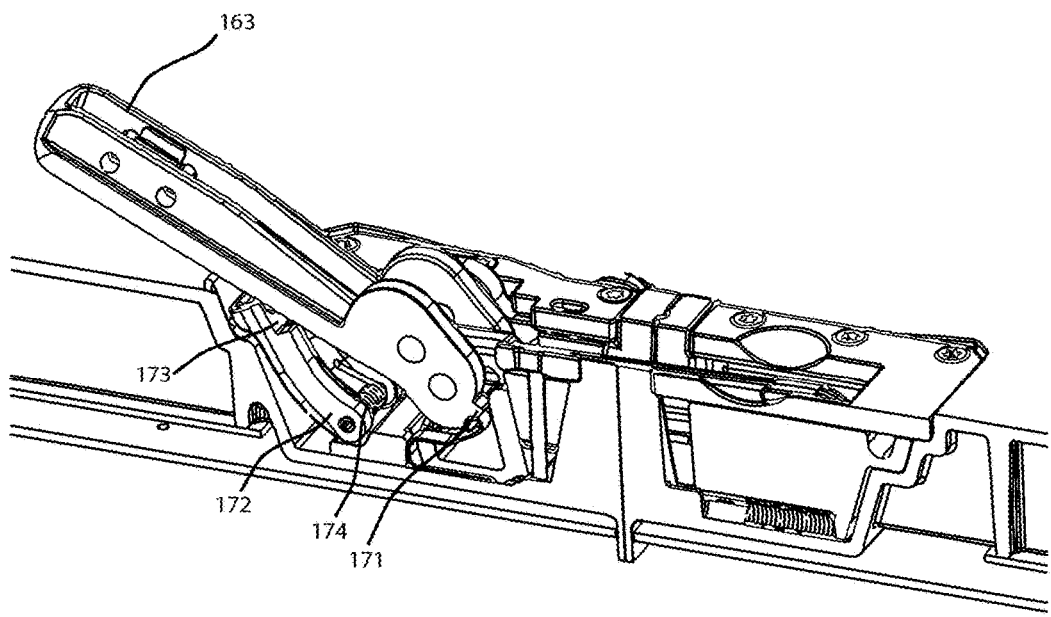
FIG. 9 shows an embodiment of the present disclosure showing the safety latch in a disengaged position.
Figure 10:
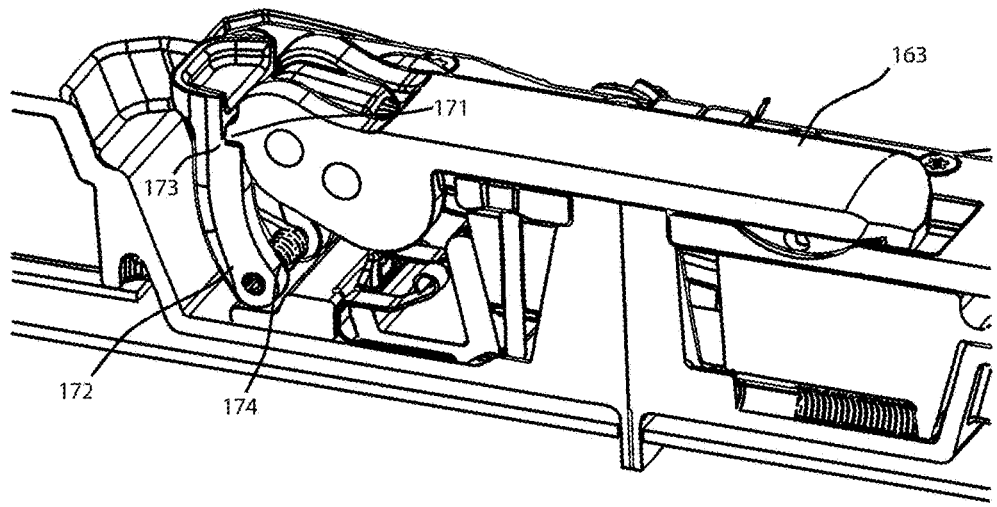
FIG. 10 shows an embodiment of the present disclosure showing the safety latch in an engaged position.

FIGS. 9 and 10 show a further embodiment of a safety latch that ensures that operating lever 163 remains latched after assembly. FIG. 9 illustrates the system in its open and unlatched position. Safety latch 172 is pushed against the rear of operating lever 163 by spring 174 but a tab 171 and detent 173 are separated and do not engage. FIG. 10 illustrates the closed and locked position. As operating lever 163 is rotated and closed tab 171 passes detent 173, this allows spring 174 to push safety latch 172 forwards. As safety latch 172 moves forwards detent 173 engages behind tab 171. In this position operating lever 163 is prevented from rotating by the engagement of tab 171 in detent 173 and is thus locked and unable to be opened accidentally. To release the operating lever the operator must depress the safety latch 172 back against the pressure of spring 174 away from operating lever 163 and allow clearance for tab 171 to pass over detent 173. Once tab 171 has cleared detent 173 the operator may release the safety latch 172. The operation of safety latch 172 and the engagement of tab 171 with detent 173 so as to lock operating lever 163 are automatic such that the operator cannot forget to engage the safety latch.

Figure 11:
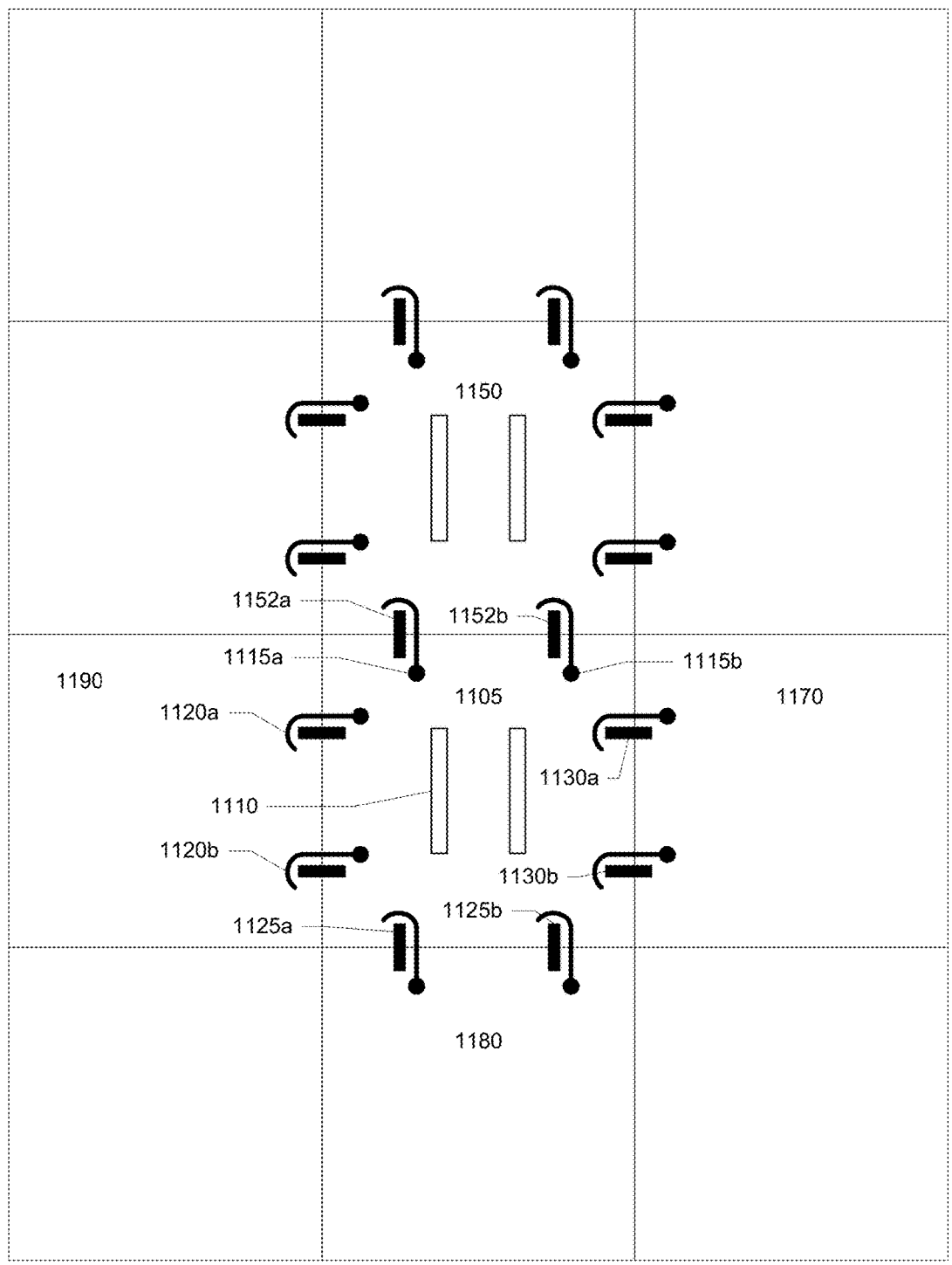
FIG. 11 shows a back view of a display made up of interlocking tiles.

FIG. 11 shows a back side of a display that is made up of one or more tiles such as shown in FIG. 5. In a specific implementation, the tiles are identical. A tile, such as a first tile 1105 includes handles 1110, a first set of clips including hooks 1115a and 1115b, a second set of clips including hooks 1120a and 1120b, a first set of clip receptacles including retractable dowels 1125a and 1125b, and a second set of clip receptacles including retractable dowels 1130a and 1130b.

The first tile interlocks with adjacent tiles via a clip on the first tile and a corresponding clip receptacle on an adjacent tile. For example, as shown in the figure, the first tile is adjacent to a second tile 1150 which is above the first tile. Hooks 1115a and 1115b of the first tile hook onto retractable dowels 1152a and 1152b of the second tile. A portion of retractable dowels 1152a and 1152b of the second tile are forced (e.g., pushed or pulled towards) into dowel receptacles (or alignment holes) in the first set of clips of the first tile. The first and second tiles are then interlocked. That is, the dowel projects past an edge or side surface of the second tile, past an edge or side surface of the first tile, and into the dowel receptacle of the first tile.

Moving in a clockwise direction around the first tile, hooks of a third tile 1170 hook onto retractable dowels 1130a and 1130b of the first tile. The third tile is adjacent to (i.e., on a right-hand side of) the first tile. Hooks of a fourth tile 1180 hook onto dowels 1125a and 1125b of the first tile. The fourth tile is below the first tile. Hooks 1120a and 1120b of the first tile hook onto retractable dowels of a fifth tile 1190. The fifth tile is adjacent to (i.e., on a left-hand side of) the first tile.

In this specific implementation, the first tile has a first, second, third, and fourth side. The second side is opposite the first side. The third side is opposite the fourth side. The first side is adjacent to the third and fourth sides. The second side is adjacent to the third and fourth sides.

The first side includes the first set of clips (e.g., hooks 1115a and 1115b). The second side includes the first set of clip receptacles (e.g., retractable dowels 1125a and 1125b). The third side includes the second set of clip receptacles (e.g., retractable dowels 1130a and 1130b). The fourth side includes the second set of clips (e.g., hooks 1120a and 1120b).

In this specific implementation, when a side of a tile has clips another side on the tile opposite the side has clip receptacles. When a side of a tile has clips another side adjacent to the side has clips. When a side of a tile has clip receptacles another side adjacent to the side has clip receptacles. In another implementation, when a side of a tile has clips another side on the tile opposite the side has clips. When a side of a tile has clip receptacles another side on the tile opposite the side has clip receptacles.

Although the figure shows the tile (e.g., first tile) having two handles, a tile can have any number of handles such as no handles, one, three, four, or more than four handles. With two handles a user can grasp or hold the tile using their two hands. A left hand of the user can grasp one handle and a right hand of the user can grasp another handle.

Figure 12:
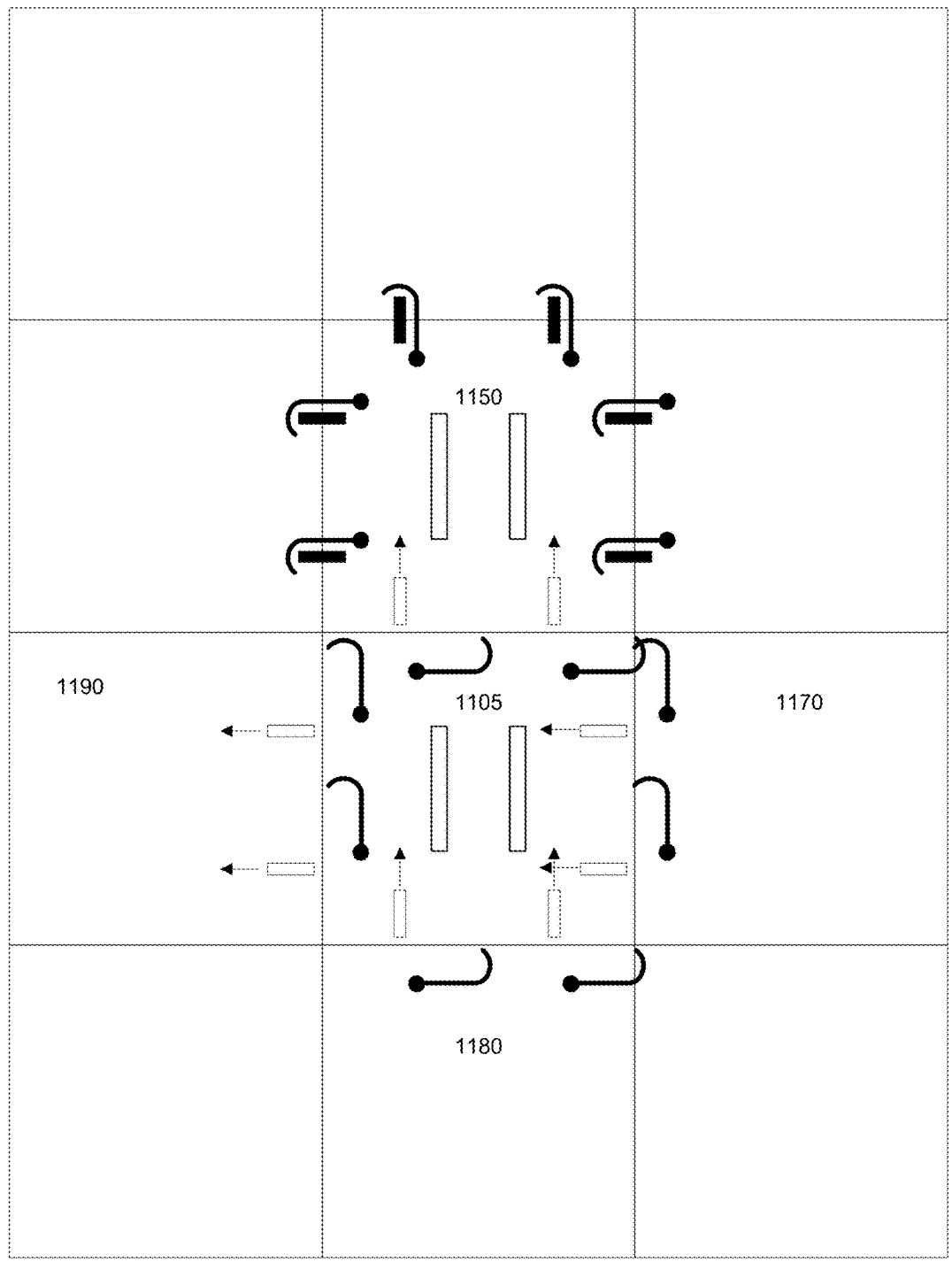
FIG. 12 shows a tile of the display being unlocked from adjacent tiles.

FIG. 12 shows the back side of the display where the first tile has been unclipped (e.g., unlocked, or disengaged) from the adjacent tiles. The first tile can be replaced (e.g., swapped or substituted) with a different tile without affecting the position of the other tiles in the display. In this specific implementation, the first tile is unclipped by unhooking the hooks around the first tile. This disengages the retractable dowels. The retractable dowels have been unfilled in FIG. 12 to indicate their disengaged state or position.

Specifically, the first tile is disengaged from the second tile by unhooking hooks 1115a and 1115b of the first tile from the clip receptacles (or retractable dowels) of the second tile. Retractable dowels 1152a and 1152b of the second tile are spring-loaded. The spring acts to urge the retractable dowels back into the tile as shown in the figure by the direction of the arrows next to each of the retractable dowels. In other words, once hooks 1115a and 1115b are unhooked from retractable dowels 1152a and 1152b, the retractable dowels retract back into the first tile. In this specific implementation, no portion of retractable dowels 1152a and 1152b of the second tile extend into the first tile. In other implementations, a portion of the retractable dowels of the second tile may extend into the first tile after the hooks have been unhooked.

A similar procedure is followed for the remaining sides of first tile 1105. That is, hooks of third tile 1170 are unhooked from retractable dowels 1130a and 1130b of the first tile and retractable dowels 1130a and 1130b retract into the first tile. Hooks of fourth tile 1180 are unhooked from retractable dowels 1125a and 1125b of the first tile and retractable dowels 1125a and 1125b retract into the first tile. Hooks 1120a and 1120b of the first tile are unhooked from the retractable dowels of fifth tile 1190 and the retractable dowels retract into the fifth tile.

The user may then grasp the handles of the first tile to remove the first tile from the display.

Figure 13:
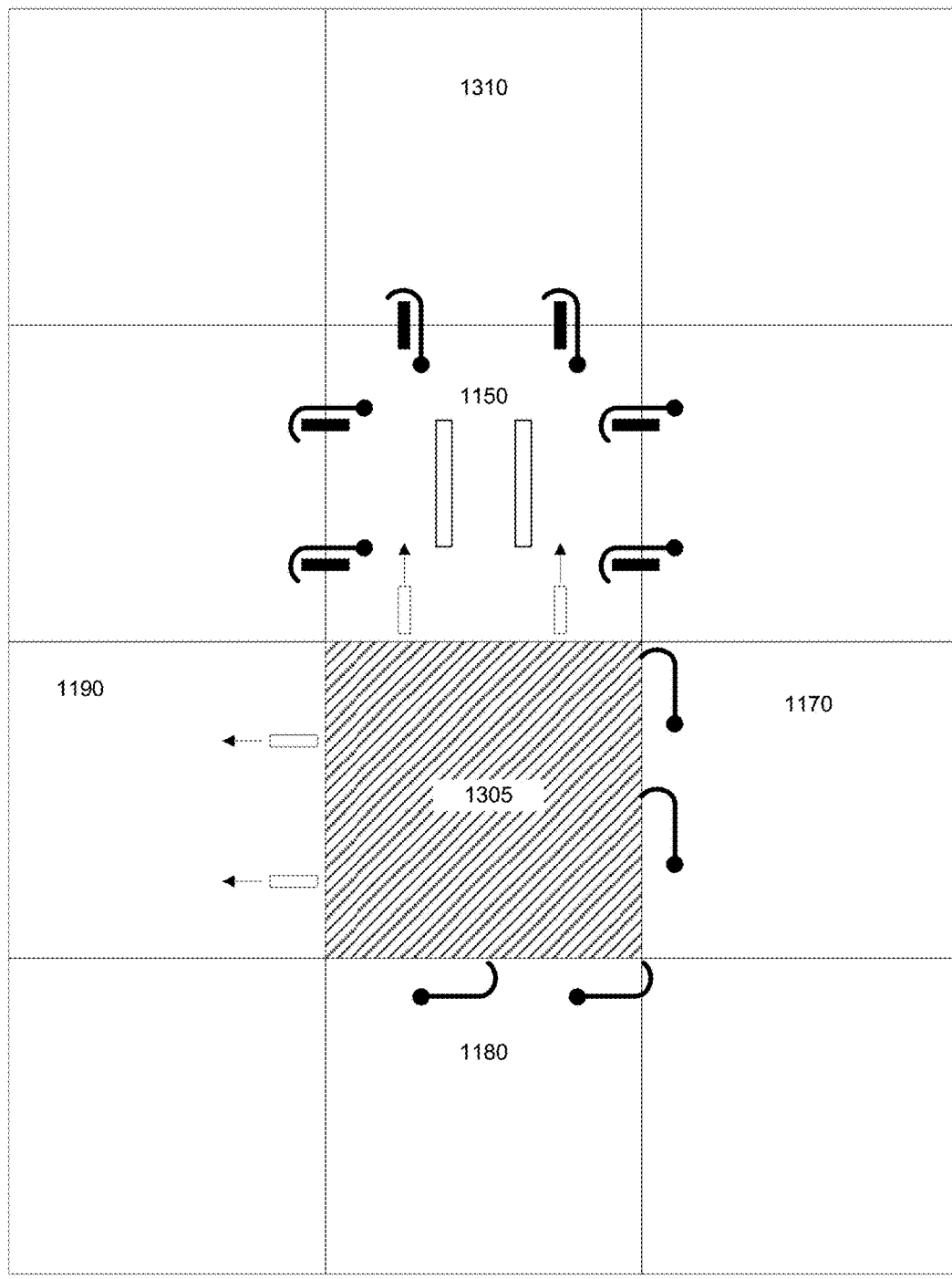
FIG. 13 shows the tile of the display removed from the display.

FIG. 13 shows the back side of the display where the first tile has been removed from the display. This leaves an opening 1305 in the display. The tiles that were adjacent to the first tile remain in position in the display. Second tile 1150 does not drop into opening 1305 because the second tile is interlocked with at least one other tile adjacent to the second tile. For example, hooks on a top side of the second tile are engaged with the retractable dowels of a tile 1310.

Figure 14A:
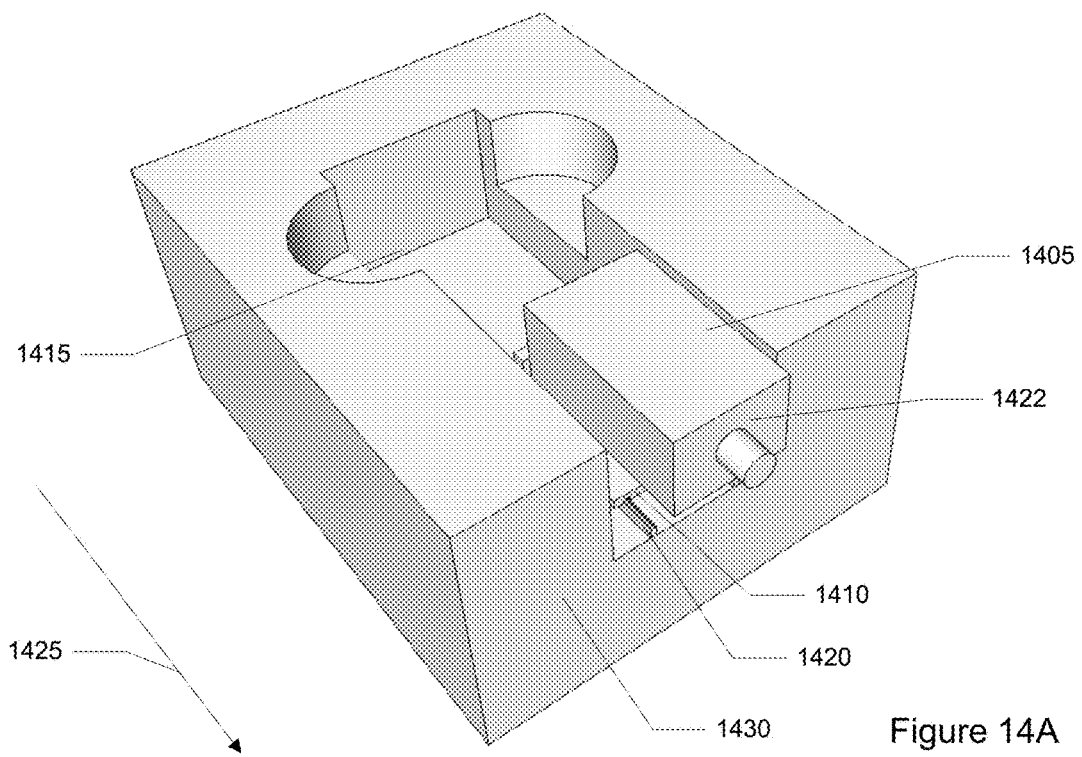
FIG. 14A shows a perspective of a specific implementation of a retractable dowel in an engaged position.

FIG. 14A shows a perspective view of a specific implementation of a retractable dowel 1405 of a first tile in an engaged position. The retractable dowel is mounted on a sliding carrier 1410 within a clip receptacle 1415. The sliding carrier slides along a set of rails 1420 within the clip receptacle. In this specific implementation, a hook of a second tile (not shown) pulls the carrier towards the second tile so that the dowel of the retractable dowel can be received by a dowel receptacle of the second tile.

In this specific implementation, a surface 1422 of the retractable dowel is not coplanar with a side edge (or surface) 1430 of the tile. That is, surface 1422 extends past surface 1430.

The sliding carrier may be spring loaded to urge the carrier and thus the retractable dowel away from the second tile and back into the clamp receptacle. The sliding carrier may include a locking mechanism to secure the retractable dowel to the carrier. The locking mechanism can have a lock and unlock position so that the retractable dowel can be replaced (i.e., replaced with an angle adjustment dowel).

In this specific implementation, the movement of the retractable dowel is constrained to move in a single plane along its axis due to the rails. For example, the movement of the retractable dowel may be along a first axis 1425 where the first axis parallel to a face of the tile or perpendicular to a side edge (or surface) 1430 of the tile.

Since in this specific implementation, the retractable dowel moves along a single axis this allows the first and second tiles to be aligned properly as discussed above. That is, the first tile will not be offset from the second tile (e.g., offset down or offset up). This helps to present a cohesive image to the viewer. However, in another implementation, the carrier, retractable dowel, or both can move along another axis in addition to the first axis.

Figure 14B:
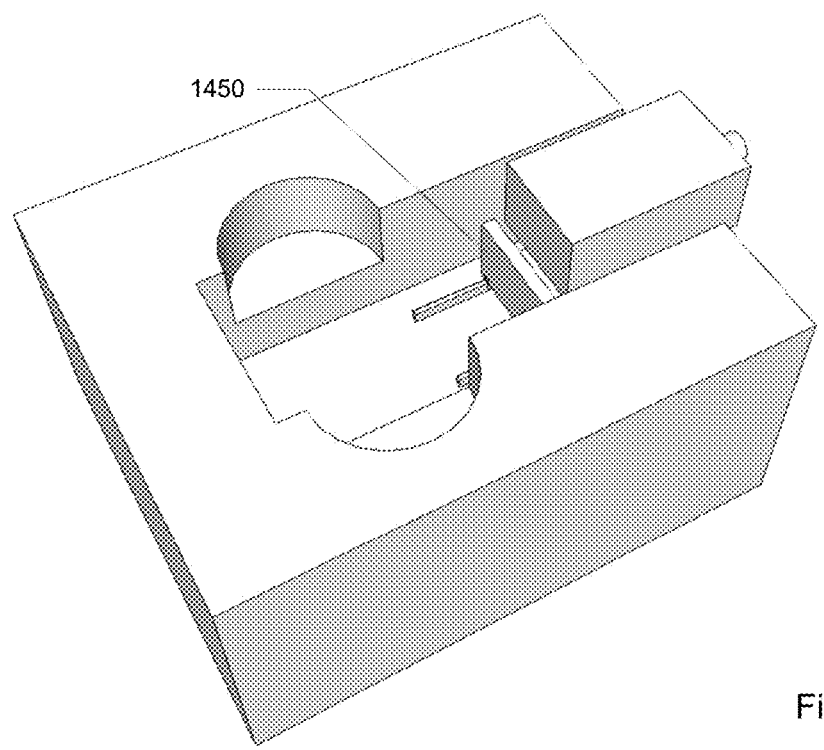
FIG. 14B shows another perspective view of the retractable dowel in the engaged position.

FIG. 14B shows another perspective view of retractable dowel 1405 mounted on sliding carrier 1410. In this specific implementation, the sliding carrier includes a back plate 1450. The hook of the second tile contacts the back plate to pull the sliding carrier from the clip receptacle towards the second tile.

Figure 15A:
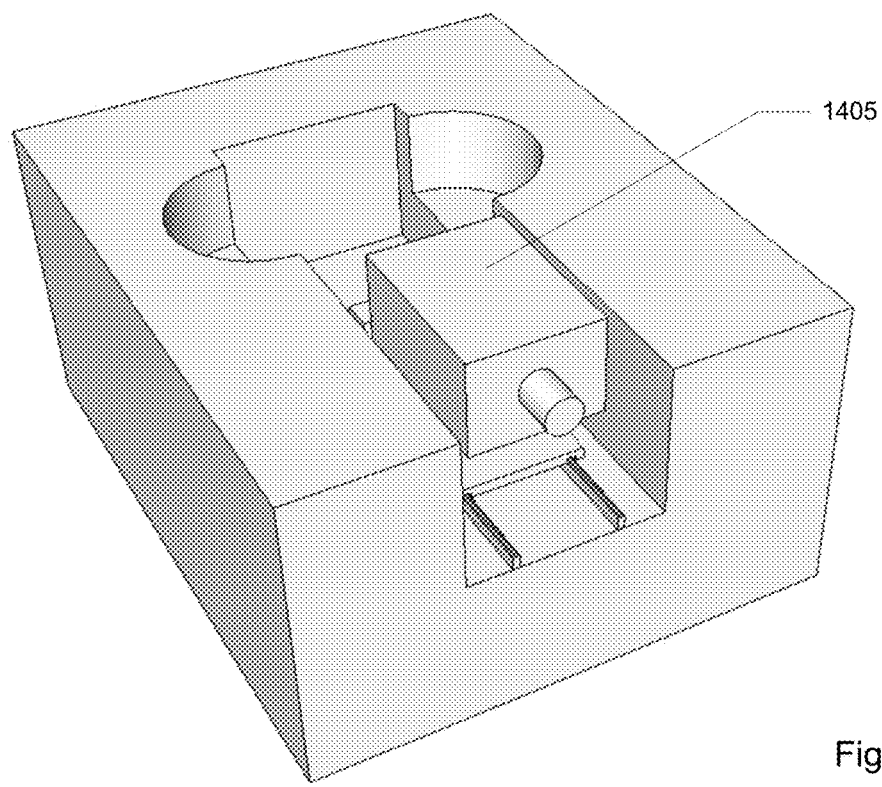
FIG. 15A shows a perspective view the retractable dowel in a disengaged position.

FIG. 15A shows a perspective view of retractable dowel 1405 of the first tile in a disengaged position. The hook of the second tile (not shown) has been unlocked from the retractable dowel. The spring of the carrier is then free to urge the carrier and thus the retractable dowel back into the clip receptacle. In a specific implementation, when the retractable dowel is in the disengaged position, surface 1422 of the retractable dowel is not coplanar with surface 1430 of the tile. That is, surface 1422 is behind surface 1430. In this specific implementation, the dowel of the retractable dowel is similarly behind surface 1430. In another implementation, when the retractable dowel is in the disengaged position, a portion of the retractable dowel extends past surface 1430.

Figure 15B:
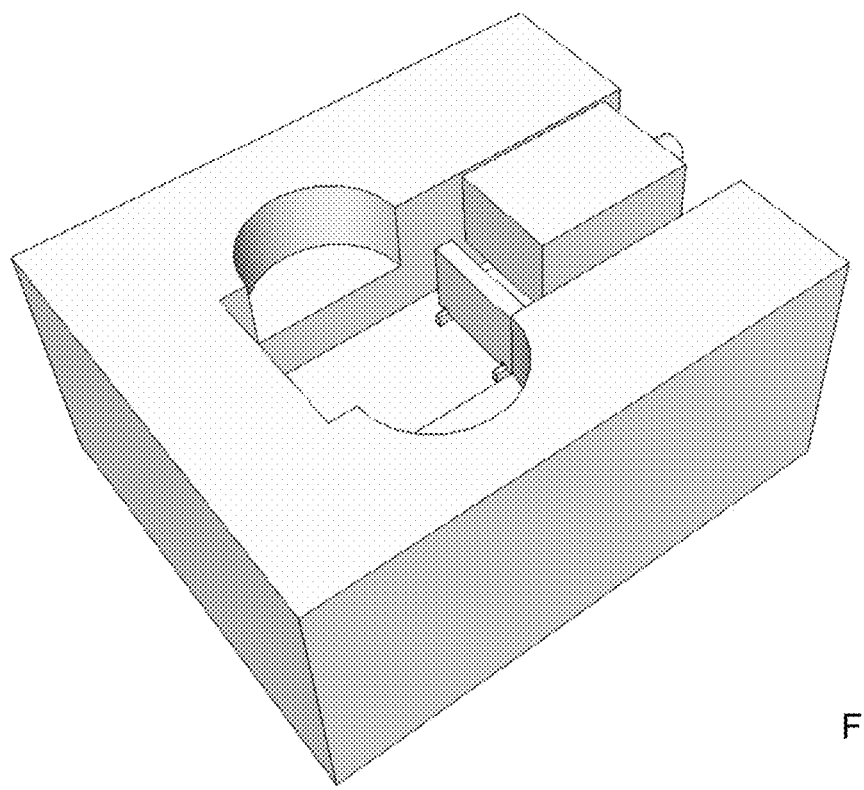
FIG. 15B shows another perspective view of the retractable dowel in the disengaged position.

FIG. 15B shows another perspective view of retractable dowel 1405 in a disengaged position.

Figure 16A:
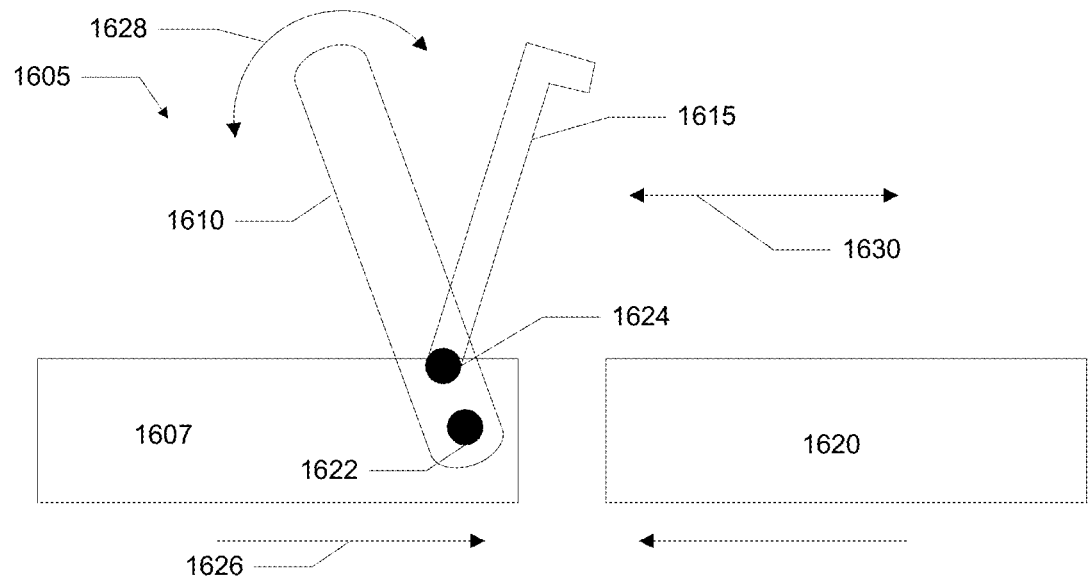
FIG. 16A shows a side view of a clamp clip.

FIG. 16A shows a side view of a specific implementation of a clamp clip 1605 of a first tile 1607. The clamp clip includes an operating lever 1610 and a hook 1615 which interlocks with a clamp receptacle of a second tile 1620. A first shaft 1622 passes through the operating lever. A second shaft 1624 passes through the operating lever and the hook. In a specific implementation, the first and second shafts are in an offset arrangement. A first vertical axis passes through the first shaft. A second vertical axis passes through the second shaft. The first vertical axis is parallel with the second vertical axis. The first and second vertical axes are not coincident.

When the hook interlocks with the clamp receptacle, tiles are pulled together as shown by arrows 1626.

As discussed above, the hook may move both parallel and perpendicular to the axis of the retractable dowel. In this specific implementation, when the operating lever is rotated as shown by arrows 1628, the offset arrangement of the first and second shafts allow the hook to move in directions 1630 which are parallel to the movement of or the axis of the retractable dowel.

Figure 16B:
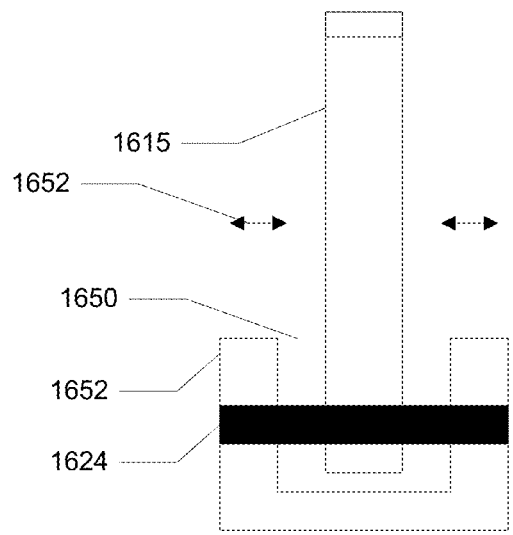
FIG. 16B shows a front view of the clamp clip.

FIG. 16B shows a front view of clamp clip 1605. This view shows a front view of hook 1615 and second shaft 1624. In this specific implementation, there is a gap 1650 between the hook and sides 1652 of the clamp clip. This gap allows the hook to float or move between the sides of the clamp clip. Specifically, the hook can move in second directions 1652 which is perpendicular first directions.

In another implementation, there is no gap 1650. A joint such as a ball and socket joint may be used to allow the hook to move in second directions 1652. A bushing (e.g., compressible bushing) between the hook and sides 1652 may be used to allow the hook to move in second directions 1652.

A user assembles a video display using one or more tiles such as shown in FIG. 5. The user can also easily reconfigure the video display by replacing a tile of the display (i.e., remove a tile from the display and insert another tile in the display). The tile to remove can be located anywhere or at any position in the display. For example, the tile to be removed may be at a corner of the display. That is, the tile to be removed may have other tiles along its two adjacent sides. The tile to be removed may be on a side of the display. That is, the tile to be removed may have other tiles along its two adjacent sides and another tile opposite one of the adjacent sides. The tile to be removed may be surrounded by other tiles. That is, the tile to be removed may have other tiles on each side.

A representative flow for replacing a tile of the video display is outlined in steps 1 to 4 below.

1. From a position behind the video display unlock a first tile of the display.

2. Remove the first tile while the other tiles remain in the display.

3. Insert a second tile in an opening of the display created by the removed first tile.

4. Lock the second tile.

In step 1, the first tile of the display is unlocked from a position behind the display. For example, the first tile may be unlocked or unclipped from one or more tiles that may be positioned adjacent to the first tile.

In step 2, the first tile is removed from the display. The first tile can be removed from behind the display. In a specific implementation, the removal includes grasping one or more handles on a back side of the first tile and pushing the tile away from the display. This leaves an opening in the display that was previously occupied by the first tile. The first tile is then tilted downwards or about a first axis passing through a center or reference point of the first tile. The first tile is then turned, twisted, or rotated about 45 degrees about a second axis, passing through the center of the first tile and orthogonal to the first axis. A bottom side or edge of the first tile is now aligned with a diagonal of the opening. The first tile can then be pulled through the opening because a length of the bottom side of the first tile is less than a length of the diagonal of the opening.

In step 3, the second tile is inserted in the opening. The second tile can be inserted from behind the display. In this specific implementation, the insertion is the reverse of step 2. That is, the second tile is tilted and rotated so that a top side of the second tile is aligned with the diagonal of the opening. The second tile can then be pushed through the opening because a length of the top side of the second tile is less than the length of the diagonal of the opening. The second tile can then be rotated about the first and second axes so that a back side of the second tile faces the opening. The second tile is then pulled towards the opening in the display.

In step 4, the second tile is locked. The second tile can be locked from behind the display. The second tile may be locked to one or more tiles adjacent to the second tile.

These features of the invention such as allowing replacement of tiles from behind the display and allowing other tiles to remain in the display provide several benefits. Scaffolding, ladders, or other equipment needed to reach or access the tile to be replaced does not have to be positioned in front of the display. Rather, this equipment can be positioned behind the display and can remain there throughout the performance. If a need arises to replace a tile during a performance (i.e., tile becomes broken) the tile can be reached quickly and easily with minimal disruption of the performance. Audience members will not be distracted by a technician having to set up a ladder in front of the display to reach the tile to replace.

Although the steps above are listed in a specific order, the steps may take place in any order, as desired and depending upon the specific application. There may be additional or other steps, which may replace one or more of the above steps. Certain steps may be repeated. In various implementations, the tile to be replaced is accessed from a front side of the display. In a specific implementation, the tile to be replaced does not have to pass through any openings of the display. In this specific implementation, the tile to be removed is pulled from the display—creating an opening in the display—without having to be pushed from the display, reoriented, and then pulled through the opening. Similarly, the replacement tile does not have to be oriented to be pushed through the opening, reoriented, and then pulled towards the opening. Rather, in this specific implementation, the replacement tile is pushed onto the opening or positioned over or covering the opening and then locked into place.

In a specific implementation, a video display includes a plurality of tiles. The video display has a first side (e.g., face, viewing side, display side, light-emitting side, or front side) and a second side (e.g., rear or back side), opposite the first side. A method to replace one or more tiles of the video display includes, from the second side, unlocking a first tile. From the second side, removing the first tile. And, from the second side, inserting or placing a second tile into an opening or over an opening created in the display by the removed first tile.

In this specific implementation, the first tile can have along any of its borders a tile. These tiles can remain in place while the first tile is being replaced with the second tile. In a specific implementation, a video display includes a plurality of tiles, each tile occupying a position on a layout of the video display.

A first tile to be replaced is in a first position of the layout. A second tile is adjacent to the first tile and is in a second position of the layout. The first tile can be replaced by a third tile while the second tile remains in the second position.

The layout or arrangement of the tiles can be described as an array of rows and columns of tiles. For example, the first position may be a second row, third column of the array.

The method may include removing the first tile from the first position of the layout and inserting the third tile into the first position of the layout. During the removing the first tile, the second tile remains in the second position of the layout. During the inserting the third tile, the second tile remains in the second position of the layout.

Furthermore, the first tile may also be adjacent to a fourth tile in a third position of the layout, a fifth tile in a fourth position of the layout, a sixth tile in a fifth position of the layout, or combinations of these. During the removing the first tile and inserting the second tile, the fourth tile can remain in the third position, the fifth tile can remain in the fourth position, and the sixth tile can remain in the fifth position.

It should also be appreciated that techniques of the invention can also apply to reorienting a tile instead of replacing the tile. For example, after the display is assembled a user may discover that a tile is upside down and needs to be reoriented. The tile to be reoriented can have along any of its borders another tile. These other tiles can remain in place while the tile is reoriented 180 degrees.

Figure 17:
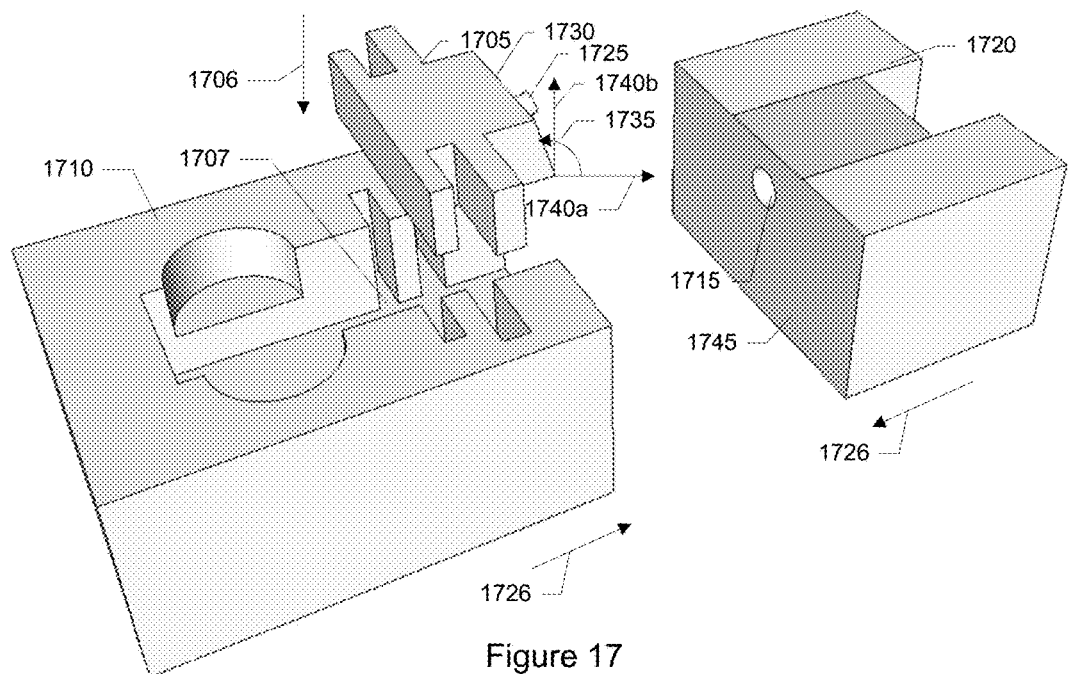
FIG. 17 shows a perspective view of a first angle adjustment dowel.

FIG. 17 shows a perspective view of a specific implementation of an angle adjustment dowel 1705 being inserted (as shown by arrow 1706) into a channel (e.g., cavity or groove) 1707 of a clamp receptacle 1710. In a specific implementation, the retractable dowel may be an angle adjustment dowel.

The clamp receptacle is attached to a rear side of a tile (not shown). The figure also shows a dowel receptacle 1715 of a clamp clip 1720 which is partially shown in the figure. The clamp clip is attached to a rear side of an adjacent tile (not shown). The dowel receptacle receives a dowel 1725 of the angle adjustment dowel when the tile and the adjacent tile are connected (i.e., when the clamp receptacle of the tile is joined with the clamp clip of the adjacent tile as indicated by arrows 1726).

A surface 1730 of the angle adjustment dowel from which the dowel projects has an angle 1735. The angle is shown measured in a counterclockwise direction from an x-axis 1740*a* where the x-axis indicates zero degrees and a y-axis 1740*b* indicates 90 degrees. The x-axis is parallel to a display side of the tile. The y-axis passes through the display side of the tile and is orthogonal to the display side. As shown in this example, the angle is greater than 90 degrees and less than 180 degrees.

When the tile and the adjacent tile are joined surface 1730 of the angle adjustment dowel abuts a surface 1745 of the clamp clip. The result is a desired angle (or viewing angle) between a display side of the tile and a display side of the adjacent tile depending on angle 1735.

For example, angle 1735 of surface 1730 may be about 100 degrees (as measured from the x-axis) and surface 1745 may be at a 90 degree angle. When the two surfaces butt against each other the desired angle is formed between the display sides of the tile and adjacent tile. In this example, the desired angle is about 190 degrees and a convex display is formed.

Channel 1707 may be referred to as an angle adjustment dowel receptacle. These receptacles are formed on a rear side of the tile and extend through one or more side edges of the tile. As seen in the figure, when the angle adjustment dowel receptacle receives the angle adjustment dowel, the dowel points towards the side edge. The angle adjustment dowel can be replaced from a back side of the tile.

Dowel 1725 may be referred to as an extension, stud, projection, peg, rod, or pin. The dowel can have any cross-sectional shape such as a circle, rectangle, square, star, triangle, pentagon, and so forth.

Figure 18:
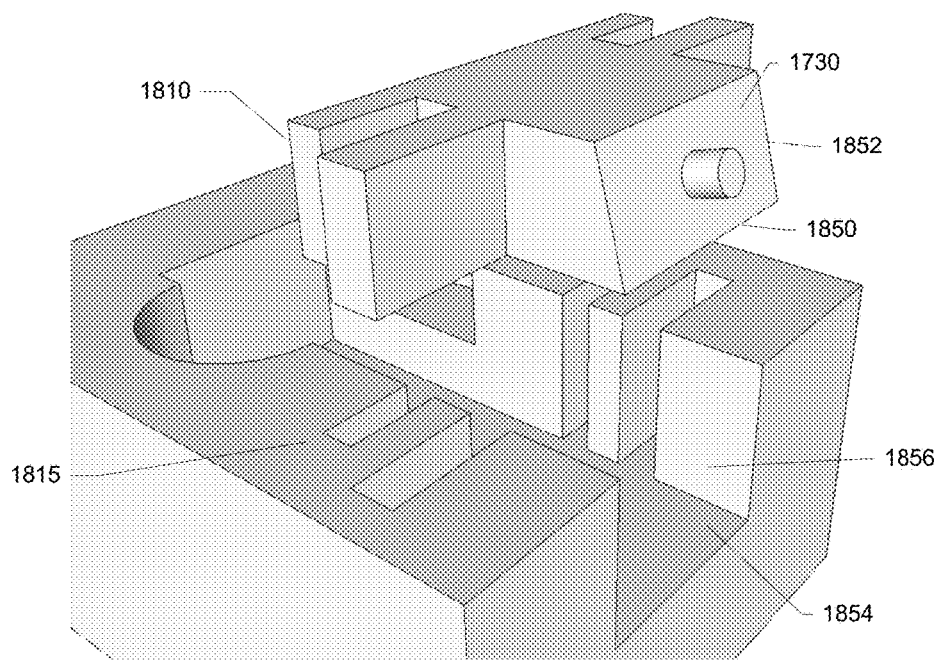
FIG. 18 shows another perspective view of the first angle adjustment dowel.

FIG. 18 shows another perspective view of angle adjustment dowel 1705 and surface 1730 from which dowel 1725 projects. The angle adjustment dowel (or block) includes a bottom edge 1850 and a side edge 1852. When the angle adjustment dowel is fitted into channel or receptacle 1707, the bottom edge touches a bottom surface 1854 of the receptacle. In this specific implementation, the bottom edge is visible through an opening 1856 of a first side edge (or first side surface) of the tile. The first side of the tile includes the first side surface joining a front surface and a back surface of the tile. In this specific implementation, surface 1730 is not coplanar with the first side surface of the tile.

Figure 21:
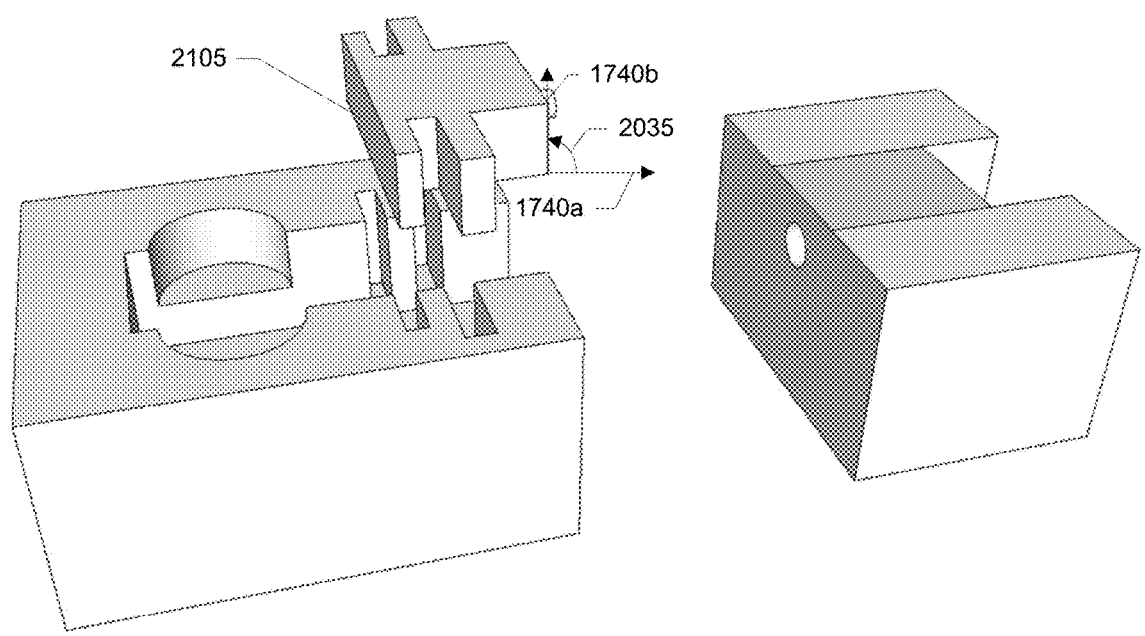
FIG. 21 shows a perspective view of a third angle adjustment dowel.
Figure 22:
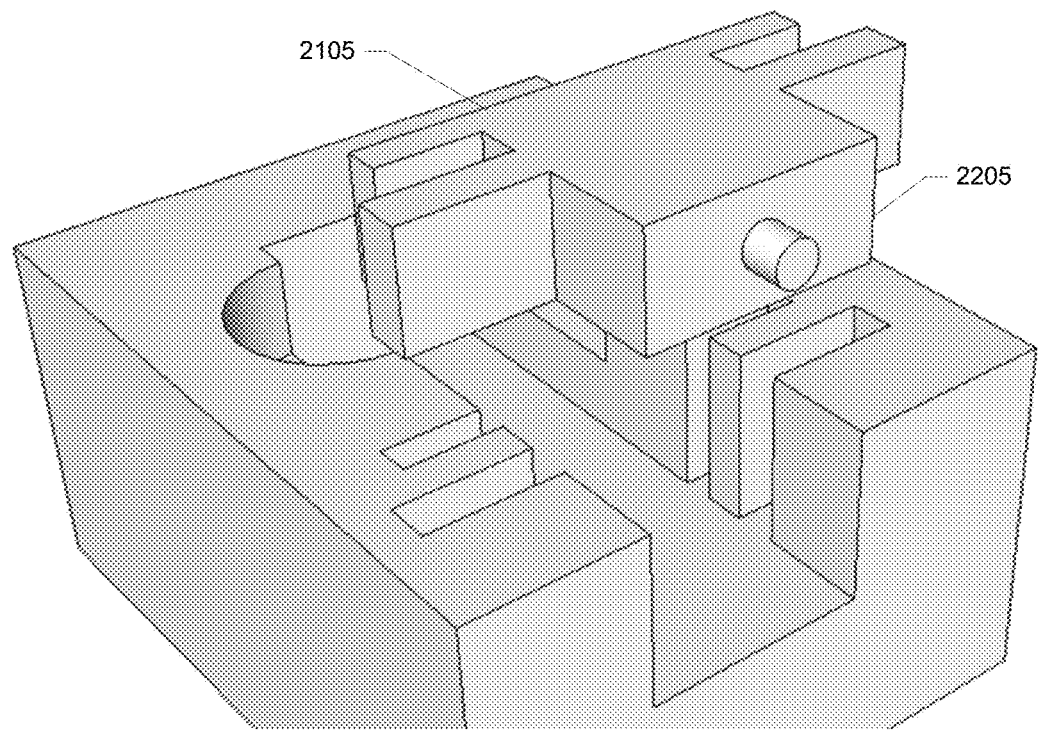
FIG. 22 shows another perspective view of the third angle adjustment dowel.

Angle adjustment dowel 1705 may be replaced with angle adjustment dowel 2105 (FIGS. 21-22). In a specific implementation, angle adjustment dowel 2105 also has a bottom edge that touches the bottom surface of the receptacle. A side edge 2205 of angle adjustment dowel 2105 extends to the bottom edge. The side edge is adjacent to the bottom edge. When angle adjustment dowel 2105 is fitted in the receptacle, side edge 2205 is visible through the opening at the first side edge and a surface from which the dowel of angle adjustment dowel 2105 projects from is planar with the first side surface of the tile.

The tile may further include a second side edge, opposite of the first edge. The second side edge may have a second opening. The second opening may have a cross-sectional shape that is the same as (or different from) a cross-sectional shape of the dowel.

As shown in this example, the dowel projects orthogonally from surface 1730 or is normal to surface 1730. However, in other implementations, the dowel may project at a different angle from surface 1730.

In a specific implementation, the angle adjustment dowel includes four fingers (e.g. guides, tabs, projections) 1810. The fingers are received by finger receptacles 1815 of clamp receptacle 1710. These fingers help ensure that the angle adjustment dowel is properly inserted into the clamp receptacle and help ensure that the angle adjustment dowel does not accidentally move or shift. In another implementation, the fingers are instead or additionally formed on the clamp receptacle and the finger receptacles are instead or additionally formed on the angle adjustment dowel.

The angle adjustment dowel may be further secured to the clamp receptacle using a retaining mechanism incorporated into the clamp receptacle. The retaining mechanism may include components such as a spring, tab, notch, and lever. The user can push the lever against the force of the spring which moves a tab and allows the angle adjustment dowel to slide into the clamp receptacle. When the lever is released the spring may urge the tab into a notch in the angle adjustment dowel. The angle adjustment dowel is then locked into place so that it can not accidentally fall out. The user can remove the angle adjustment dowel by again pushing the lever to urge the tab out of the notch. The angle adjustment dowel is now unlocked and can be pulled from the clamp receptacle. For example, the user can insert their finger into a portion of the channel, pinch the angle adjustment dowel, and pull the angle adjustment dowel out. A new angle adjustment dowel can then be inserted by following a reverse procedure.

The dowel and dowel receptacle can be used to help guide and align the interlocking of the tile and the adjacent tile. In this specific implementation, the dowel and dowel receptacle have circular cross sections. However, it should be appreciated that they can have any cross-sectional shape (e.g., square, rectangle, triangle, and so forth). Furthermore, there can be any number of dowels and any number of dowel receptacles. The dowel can be located anywhere on surface 1730. The dowel receptacle can be located anywhere on surface 1745.

The dowel and dowel receptacle are merely one example of a structural interface between the clamp receptacle and clamp clip which interlock a tile and an adjacent tile. In various other implementations, the structural interface may instead or additionally include a tongue and groove interface, a dovetail mating (i.e., a flaring tenon and a mortise into which it fits forming an interlocking joint), a ball and socket interface, and so forth.

In a specific implementation, the angle adjustment dowel is accessible from a back side of the tile via the adjustment receptacle. In this specific implementation, the receptacle is visible on the back side and extends along a portion of the back side to a side surface of the tile (i.e., through an opening on the side surface).

In another implementation, the angle adjustment dowel is instead accessible from the side surface of the tile. In this specific implementation, the angle adjustment dowel is not accessible from the back side. Rather, in this specific implementation, the angle adjustment dowel is inserted through the opening in the side surface of the tile. The receptacle may or may not be visible from the back side of the tile.

Angle 1735 of the angle adjustment dowel can have any measurement so that any angle can be formed between the tile and an adjacent tile.

Figure 19:
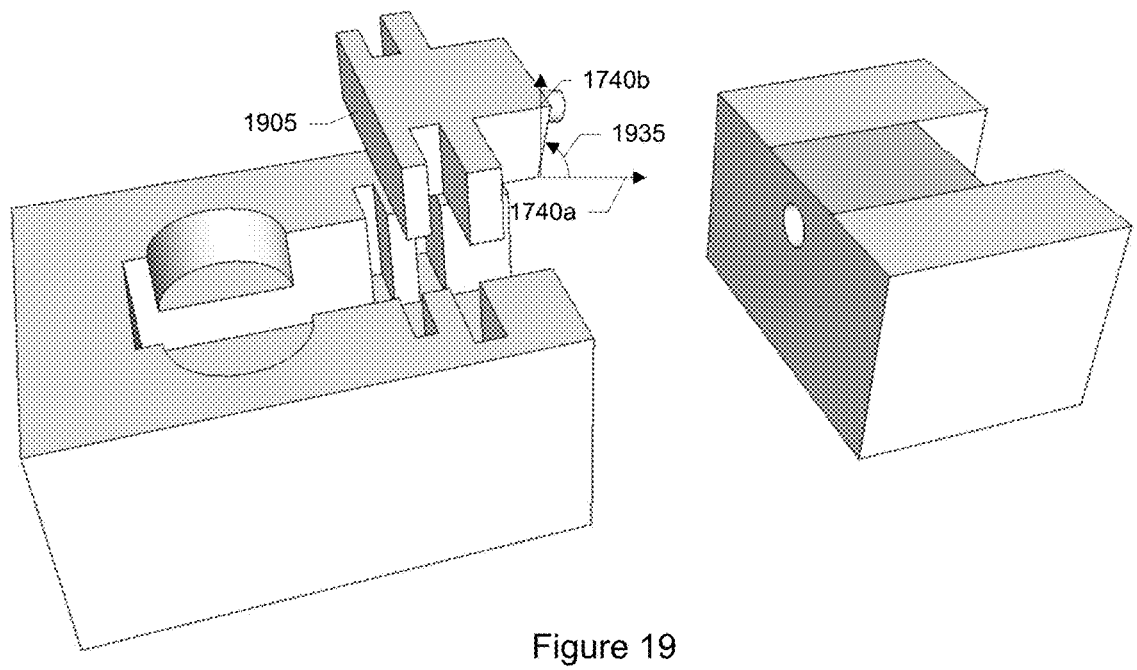
FIG. 19 shows a perspective view of a second angle adjustment dowel.

FIG. 19 shows a perspective view an angle adjustment dowel 1905 being inserted into clamp receptacle 1710. This angle adjustment dowel is similar to the angle adjustment dowel shown in FIGS. 17-18, but this angle adjustment dowel has a different angle. This angle adjustment dowel has an angle 1935 which as shown in the figure is less than 90 degrees as measured from x-axis 1740*a*.

In this specific implementation, when clamp receptacle 1710 of the tile is interlocked with clamp clip 1720 of the adjacent tile a concave display is formed.

Figure 20:
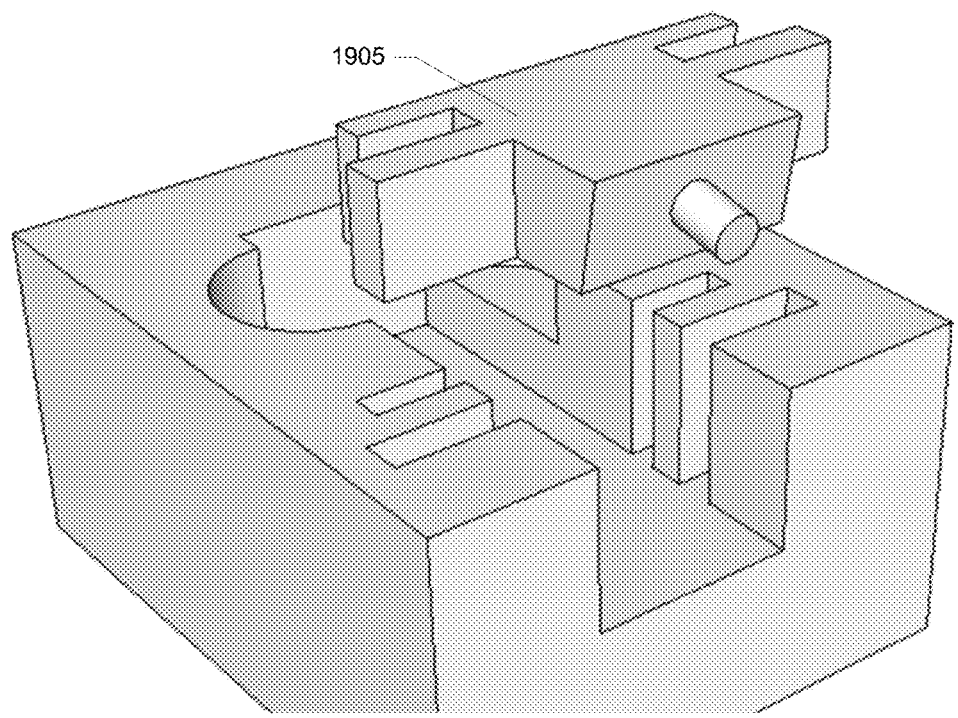
FIG. 20 shows another perspective view of the second angle adjustment dowel.

FIG. 20 shows another perspective view of angle adjustment dowel 1905.

FIG. 21 shows a perspective view of an angle adjustment dowel 2105. This angle adjustment dowel is similar to the angle adjustment dowels shown in FIGS. 17-18 and 19-20, but this angle adjustment dowel has a different angle. This angle adjustment dowel has an angle 2035 which as shown in the figure is about 90 degrees as measured from x-axis 1740*a*.

In this specific implementation, when the clamp receptacle of the tile is interlocked with the clamp clip of the adjacent tile a planar display is formed.

FIG. 22 shows another perspective view of angle adjustment dowel 2105.

The angle adjustment dowels shown in FIGS. 17-22 can have any angle. Depending on what type of display a user desires to create the user can select one or more angle adjustment dowels having a specific angle. The user can create planar, convex, or concave displays using the same tiles, but different angle adjustment dowels for each display type. Furthermore, combinations of different display types can be created. Using the tiles and angle adjustment dowels, displays resembling, for example, a bowl, pan, ball, sphere, ripples, or waves can be created. For example, a first portion of a display may have a concave arrangement of tiles. A second portion of the display may have a convex arrangement of tiles.

A user assembles a video display using one or more tiles such as shown in FIG. 5. The user can create any desired angle or curvature between two tiles by selecting the appropriate angle adjustment dowel and replacing (i.e., swapping or substituting) an old angle adjustment dowel. A representative flow for changing the angle between two tiles is outlined in steps 1 to 4 below.

1. Unlock and remove a tile of the display.
2. Remove a first angle adjustment dowel from the tile.
3. Insert a second angle adjustment dowel into the tile.
4. Place the tile back into the display.

In step 1, the tile is unlocked and removed from the display. For example, the tile may be unlocked by unclamping a first clamp portion of the tile from a second clamp portion of an adjacent tile. The tile can then be removed or pulled from the display.

In step 2, a first angle adjustment dowel is removed from the tile. The first angle adjustment dowel may be removed by pulling the first angle adjustment dowel from a cavity (e.g., hole, slot, opening, space, hollow, aperture, notch, or groove) in the first clamp portion.

Figure 23:
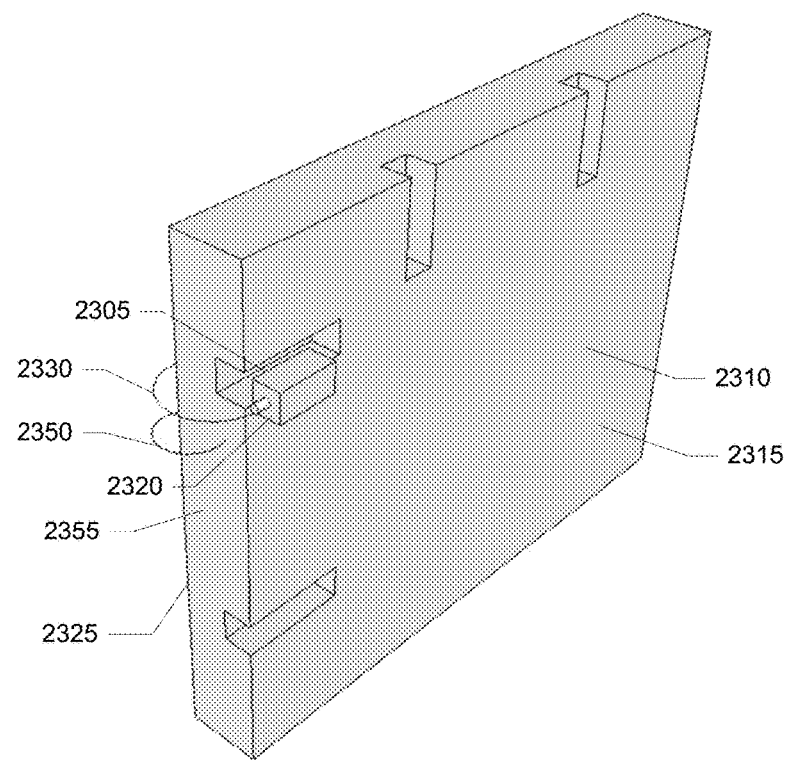
FIGS. 23-24 shows perspective views of replacing an angle adjustment dowel in a tile.

FIG. 23 shows a perspective view of removing first angle adjustment dowel 2305 from a rear (or back or nondisplay) side 2310 of a tile 2315. A face or surface 2320 of the first angle adjustment dowel may be perpendicular to a front or display side 2325 of the tile or may be at some other angle. In this specific implementation, the display side lies on a first plane. Surface 2320 lies on a second plane. The first and second planes intersect at a 90-degree angle. Depending on one's perspective, a first angle 2330 of the first angle adjustment dowel may be measured from the display side to surface 2320.

In step 3, a second angle adjustment dowel is inserted into the tile, i.e., inserted into the now empty cavity of the first clamp portion.

Figure 24:
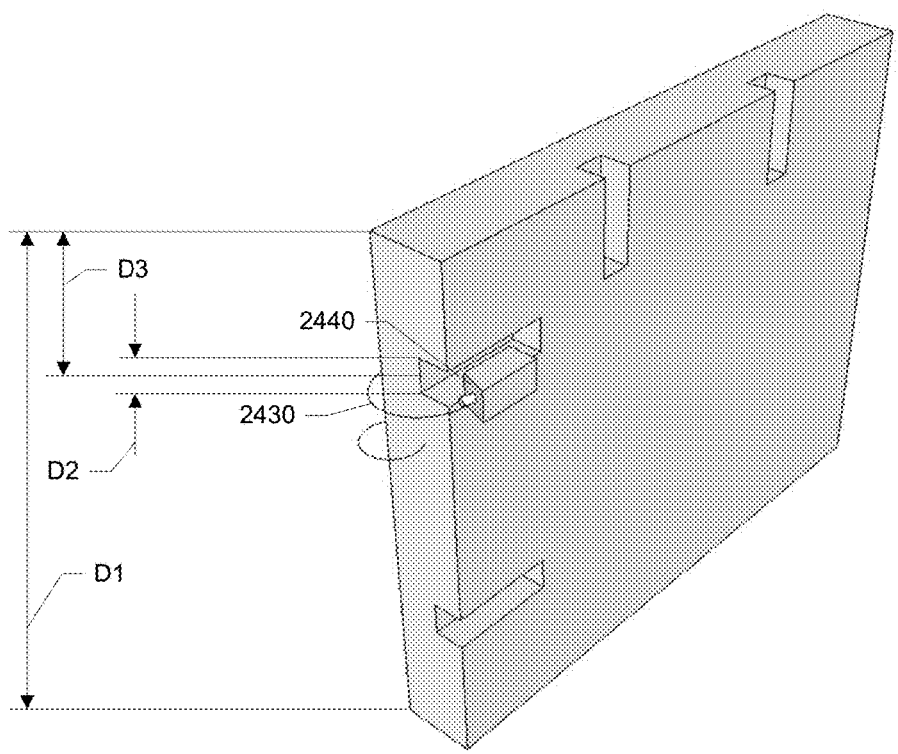

FIG. 24 shows a perspective view of inserting the second angle adjustment dowel into the tile. A second angle 2430 of the second angle adjustment dowel is measured from the display side to a surface 2440 of the second angle adjustment dowel. As seen in FIGS. 23-24, the second angle is different from the first angle.

The inserts, cavity, or both may have a keying feature to help ensure that the insert is inserted properly into the cavity. In an implementation, if the user attempts to place an insert into the cavity, but the insert is oriented incorrectly (e.g., upside down), the keying feature prevents the incorrectly oriented insert from being placed into the cavity. Furthermore, the insert, cavity, or both may have a locking feature so that the insert does not accidentally fall out when the tile is removed. The locking feature may be a magnet, a snap-fit mechanism between the insert and cavity, friction between the surfaces of the cavity and insert, and the like.

In step 4, the tile is placed back into the display.

Although the steps above are listed in a specific order, the steps may take place in any order, as desired and depending upon the specific application. There may be additional or other steps, which may replace one or more of the above steps. Certain steps may be repeated. For example, the tile may have two or more clamps that each need to be unlocked. Some of the two or more clamps may each have an angle adjustment dowel to be replaced. Some of the two or more clamps may have the same angle adjustment dowel (i.e., having same angles). Some of the two or more clamps may have different angle adjustment dowels (i.e., having different angles).

Referring now to FIGS. 23-24, a third angle 2350 is measured from the display side to a side (or side edge) 2355 of the tile.

In a specific implementation, a tile includes a display side and a side. The side is at a third angle with respect to the display side. The tile further includes a first angle adjustment dowel. The first angle adjustment dowel is at a first angle with respect to the display side. In this specific implementation, the first angle is the same as the third angle. In another implementation, the first angle is different from the third angle.

A method includes replacing the first angle adjustment dowel with a second angle adjustment dowel. The second angle adjustment dowel is at a second angle with respect to the display side. In this specific implementation, the second angle is different from the first angle. The second angle is different from the third angle.

In a specific implementation, the angle adjustment dowel in the tile is pushed or pulled towards the adjacent tile when the tile and adjacent tile are joined. In this specific implementation, the angle adjustment dowel is pulled by the force of the clamp clip or hook on the adjacent tile. The angle adjustment dowel in the tile slides (e.g., slides on a track) towards the adjacent tile so that the angle adjustment dowel can butt up against the adjacent tile; and so that the dowel receptacle in the adjacent tile can receive the dowel. Thus, in this specific implementation, the angled surface of the angle adjustment dowel (or a portion of the surface) will protrude past the side of the tile in order to meet a side of the adjacent tile. Similarly, the dowel (or a portion of the dowel) will protrude past the side of the tile in order to pass into the dowel receptacle in the adjacent tile. The clamp is then locked.

In this specific implementation, the angle adjustment dowel is under the force of a spring. The spring urges the angle adjustment dowel away from the adjacent tile. When the tile is disconnected from the adjacent tile the spring, i.e., clamp is unlocked, the spring causes the angle adjustment dowel to retract into the tile (i.e., away from the adjacent tile). The angle adjustment dowel may retract at such a distance into the channel of the tile that the dowel, the surface from which the dowel projects, or both do not project past the side of the tile. This can help prevent the angled adjustment dowel from snagging (e.g., prevent the dowel from snagging on a wire).

Thus, in a first position, the angle adjustment dowel of a tile does not project past a side of the tile. In a second position, a portion of the angle adjustment dowel projects past the side of the tile. The portion may project or be received by a receptacle (i.e., dowel receptacle) in an adjacent tile.

Referring now to FIG. 24, a distance D1 indicates a length of the tile. A distance D2 indicates a width of the angle adjustment dowel or channel in the clamp portion that receives the angle adjustment dowel. A distance D3 indicates a position of the angle adjustment dowel (or channel) along the length of the tile. As shown in the figure, distance D3 is measured from an edge (e.g., top edge) of the tile to the angle adjustment dowel.

In a specific implementation a ratio of D2 to D1 is about 1:22.6. Other examples of the ratio include 1:15, 1:16, 1:17, 1:18, 1:19, 1:20, 1:21.5, 1:21.6, 1:21.7, 1:21.8, 1:21.9, 1:22, 1:22.1, 1:22.2, 1:22.3, 1:22.4, 1:22.5, 1:22.7, 1:22.8, 1:22.9, 1:23, 1:23.1, 1:23.2, 1:23.3, 1:23.4, 1:23.5, 1:24, 1:25, 1:26, 1:27, 1:28, 1:29, and 1:30. A wider D2 offers more support and a greater area of surface contact between the angle adjustment dowel of a tile and the surface of an adjacent tile as compared to a narrower D2. A greater area of surface contact between the tiles can create a stiffer display.

However, a wider D2 (i.e., wider angle adjustment dowel) may require additional material as compared to a narrower D2. A narrower D2 (i.e., a narrower angle adjustment dowel) requires a smaller or narrower channel in the tile (or clamp portion). This can provide additional room in the tile for the electrical components (e.g., wiring) of the tile.

In a specific implementation, the angle adjustment dowel is positioned about one fifth down from the edge of the tile. That is, D3 is about 20 percent of D1, but can range from about 10 percent of D1 to about 50 percent of D1 (i.e., halfway down the tile). For example, D3 may be about 15, 25, 30, 35, 40, 45 percent, or more than 50 percent of D2. In other implementations D3 is less than 10 percent of D2. However, the angle adjustment dowel may be positioned anywhere along the side of the tile. For example, the angle adjustment dowel may be positioned one-fourth, one-third, or one-half (i.e., in the middle) down the side of the tile.

In a specific implementation, a video display includes a plurality of tiles. A first angle is between a first tile and a second tile. A method to change the first angle includes removing the first tile from the display. Removing a first angled insert having a second angle from the first tile. Inserting a second angled insert having a third angle, different from the second angle, into the first tile. Placing the first tile back into the display. A fourth angle, different from the first angle, is now between the first and second tiles.

A tile can have any number of angled inserts on any side of the tile and have any angle. This allows, for example, the creation of a video display that curves in multiple directions or dimensions such as a sphere (or a portion of a sphere) or a bowl (or a portion of a bowl). A user can change one or more angled inserts of a tile to vary the curvature or degree of curvature of the video display. A display can have a varying degree of curvature. For example, a degree of curvature for a portion of the display may be different from a degree of curvature for another portion of the display. In other words, the display can have increasing radii, decreasing radii, or both.

Depending upon the application, some angled inserts of a tile may not be replaced while other angled inserts of the tile are replaced. An angled insert of a tile may be switched from one side of the tile to another side (e.g., opposite side or adjacent side) of the tile.

In a specific implementation, method for changing a curvature of a video display having a plurality of tiles includes removing a tile from the display. The tile includes a first plurality of angled inserts. A first insert having a first angle is located on a first side (e.g., right-hand side) of the tile. A second insert having a second angle is located on the first side. The first and second angles may be the same or different. The method includes replacing the first insert with a third insert having a third angle and replacing the second insert with a fourth insert having a fourth angle. The third and fourth angles may be the same or different. The first angle may be the same or different from the third angle. The second angle may be the same or different from the fourth angle.

The second insert may instead be located on a second side (e.g., left-hand side) of the tile. The second side of the tile may be opposite the first side or adjacent to the first side (e.g., bottom side or top side).

In a specific implementation, angled inserts of two or more tiles of a display are changed to change the curvature of the display. The method includes removing a first tile from the display. Replacing a first angled insert having a first angle in the first tile with a second angled insert having a second angle, different from the first angle. Removing a second tile from the display. Replace a third angled insert having a third angle in the second tile with a fourth angled insert having a fourth angle, different from the third angle. Inserting the first and second tiles back into the display.

Generally, other tiles in the display adjacent to the tiles to be removed so that their angled inserts can be replaced can remain in situ.

In a specific implementation, a tile has two angle adjustment dowels on one side and two angle adjustment dowels on an adjacent side. However, a tile can have any number of angle adjustment dowels. A tile can have angle adjustment dowels having a first angle on a first side of the tile. The tile can have angle adjustment dowels having a second angle on a second side of the tile. The first and second angles may be the same or different. The first side may be opposite the second side. For example, the first side may be a top side and the second side may be a bottom side. The first side may be a left-hand side and the second side may be a right-hand side.

The first and second sides may be adjacent. For example, the first side may be a top side and the second side may be a right-hand side or a left-hand side.

Furthermore, in another specific implementation, angle adjustment dowels are received by both the clamp receptacle and the clamp clip. The angle adjustment dowel received by the clamp receptacle may have an angle that is different or the same as the angle of the angle adjustment dowel received by the clamp clip. An angle adjustment dowel may be received by the clamp clip, but not the clamp receptacle.

In various implementations, the angle adjustment dowels are included with the tiles when the tiles are purchased. The angle adjustment dowels are not included with the tiles and must be purchased separately. The angle adjustment dowels are included in a kit of angle adjustment dowels. The kit may be purchased separately from the tiles.

In a specific implementation, first and second angle adjustment dowels are fitted to first and second halves (e.g., sides, parts, or portions) of a clamp, respectively, have supplementary angles or angles such that when the first and second halves of the clamp are pulled together, a planar display is formed as shown, for example, in FIG. 8. In this specific implementation, the first and second angle adjustment dowels can have any angle so long as the first and second tiles, when brought together, form a 180 degree angle with respect to the viewing or display side. For example, the first and second angle adjustment dowels can have the same angle such as 90 degrees (e.g., 90 degrees+90 degrees=180 degrees). The first and second angle adjustment dowels can have different angles, such as 45 degrees and 135 degrees (e.g., 45 degrees+135 degrees=180 degrees).

In another implementation, first and second angle adjustment dowels have angles such that when the first and second halves of the clamp are pulled together, an angle between the first and second tile is greater than 180 degrees as shown, for example, in FIGS. 10 and 14 to produce a convex nonplanar display. For example, the first angle adjustment dowel may have a 90-degree angle and the second angle adjustment dowel may have a 95-degree angle (e.g., 90 degrees+95 degrees=185 degrees which is greater than 180 degrees).

In another implementation, the first and second angle adjustment dowels have angles such that when the first and second halves of the clamp are pulled together, an angle between the first and second tiles is less than 180 degrees as shown, for example, in FIGS. 12 and 16 to produce a concave nonplanar display. For example, the first angle adjustment dowel may have a 90-degree angle and the second angle adjustment dowel may have an 85-degree angle (e.g., 90 degrees+85 degrees=175 degrees which is less than 180 degrees). It should be appreciated that the first and second angle adjustment dowels can have any angle (e.g., 0, 5, 10, 15, 20, 25, 35, 45, 60, 90, or 135 degrees, and so forth). The angles may be supplementary as discussed or complementary (i.e., sum of their measures is 90 degrees). An angle can be acute (i.e., less than 90 degrees) or obtuse (i.e., between 90 degrees and 180 degrees).

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A system comprising:
   a first light-emitting tile comprising a plurality of light emitting diodes and a first connecting member positioned adjacent to a first edge of the first light-emitting tile; and
   a second light-emitting tile comprising a plurality of light emitting diodes and a second connecting member positioned adjacent to a second edge of the second light-emitting tile,
   wherein the first light-emitting tile and the second light-emitting tile are coupled together by the first connecting member coupling with the second connecting member so a side of the first light-emitting tile abuts a side of the second light-emitting tile.

2. The system of claim 1 wherein the first light-emitting tile can be decoupled from the second light-emitting tile while the second light-emitting tile remains coupled to any light-emitting tiles the second light-emitting tile was coupled to other than the first light-emitting tile.

3. The system of claim 1 wherein the first connecting member comprises a hook and the second connecting member comprises a receptacle.

4. The system of claim 1 wherein the first connecting member comprises a hook coupled to a lever mechanism, and the lever mechanism comprises a safety latch that prevents the hook from releasing accidentally.

5. The system of claim 1 comprising allowing a dowel of the second connecting member to be movable from a nonretracted position to a retracted position and from the nonretracted position to the retracted position.

6. The system of claim 5 wherein when the dowel is in the nonretracted position, allowing at least a portion of the dowel to be positioned in an aperture of the first connecting member.

7. The system of claim 6 wherein when the dowel is in the retracted position, allowing the dowel not to be positioned in the aperture of the first connecting member.

8. The system of claim 5 comprising allowing a biasing element of the second connecting member to bias the dowel from the non-retracted position to the retracted position.

9. The system of claim 8 wherein the biasing element is a spring mechanism.

10. The system of claim 1 wherein the first connecting member comprises a hook coupled to a lever mechanism, and when the lever mechanism is moved from a first position to a second position, the hook moves the dowel from the retracted position to the nonretracted position such that at least a portion of the dowel is positioned in an aperture of the first connecting member.

11. The system of claim 10 wherein the hook opposes a biasing force of a biasing element that biases the dowel from the non-retracted position to the retracted position.

12. A system comprising:
   a first light-emitting tile comprising a plurality of light-emitting elements disposed thereon and a first connecting member positioned adjacent to an edge thereof;
   a second light-emitting tile comprising a plurality of light-emitting elements disposed thereon and a second connecting member positioned adjacent to a first edge thereof and a third connecting member positioned adjacent to a second edge thereof; and
   a third light-emitting tile comprising a plurality of light-emitting elements disposed thereon and a fourth connecting member positioned adjacent to an edge thereof,
   wherein the first and second light-emitting tiles are coupled together by way of the first and second connecting members, and the second and third light-emitting tiles are coupled together by way of the third and fourth connecting members.

13. The system of claim 12 wherein the first light-emitting tile and the second light-emitting tile are coupled together by the first connecting member coupling with the second connecting member such that a side of the first light-emitting tile abuts a side of the second light-emitting tile, the second light-emitting tile and the third light-emitting tile are coupled together by the third connecting member coupling with the fourth connecting member such that a side of the second light-emitting tile abuts a side of the third light-emitting tile, and the first light-emitting tile can be decoupled from the second light-emitting tile while the second light-emitting tile remains coupled to the third light-emitting tile.

14. The system of claim 12 wherein the second edge is opposite of the first edge of the second light-emitting tile.

15. The system of claim 12 wherein when the first light-emitting tile is coupled to the second light-emitting tile and the second light-emitting tile is coupled to the third light-emitting tile, the first light-emitting tile and the third light-emitting tile do not abut each other.

16. The system of claim 12 wherein the first connecting member comprises a hook and the second connection member comprises a receptacle.

17. The system of claim 12 wherein the first connecting member comprises a clip mechanism.

18. The system of claim 12 wherein the second connecting member comprises a retractable dowel.

19. The system of claim 12 wherein the second connecting member comprises an alignment hole.

20. The system of claim 12 wherein the first connecting member comprises a hook coupled to a lever mechanism, and the lever mechanism comprises a safety latch that prevents the hook from releasing accidentally.

\* \* \* \* \*